US005240051A

United States Patent [19]

Quick et al.

[11] Patent Number: 5,240,051

[45] Date of Patent: Aug. 31, 1993

[54] DUAL AUTOMATED CLAMP CARRIER

[75] Inventors: Bradley S. Quick, Staatsburg; John Mortoly, Jr., Poughkeepsie, both of N.Y.

[73] Assignee: James L. Taylor Mfg. Co., Inc., Poughkeepsie, N.Y.

[21] Appl. No.: 749,047

[22] Filed: Aug. 23, 1991

Related U.S. Application Data

[63] Continuation-in-part of Ser. No. 656,226, Feb. 14, 1991, abandoned, which is a continuation-in-part of Ser. No. 244,915, Sep. 14, 1988, Pat. No. 4,952,269, which is a continuation of Ser. No. 846,363, Mar. 31, 1986, Pat. No. 4,778,555.

[51] Int. Cl.[5] .......................... B23Q 3/08; B27D 1/00

[52] U.S. Cl. .................................. 144/352; 144/344; 144/356; 144/242 B; 144/245 B; 156/350; 269/25

[58] Field of Search ............... 144/2 R, 242 R, 242 B, 144/245 B, 344, 356; 269/25, 27, 31; 156/350, 558; 100/232

[56] References Cited

U.S. PATENT DOCUMENTS 4,778,555 10/1988 Mortoly et al. .................... 156/350

*Primary Examiner*—W. Donald Bray

[57] ABSTRACT

A Dual Automated Clamp Carrier provides an apparatus which enables three different activities to be conducted simultaneously at three different levels of the apparatus. The upper level is the location at which clamps previously tightened for gluing panels of wood are untightened automatically. The mid level is the location where the completed panels are removed from the clamps from the loosened clamps and panel segments coated with moist glue are positioned in the clamp for clamping and processing. The lower level is the location where the clamps are automatically tightened. Appropriate support elements for the upper and lower levels allow a carriage including a powered clamp tightener/loosener wrench to be automatically positioned to engage each of the clamps to loosen or tighten the clamps as necessary. The lower carriage also includes an apparatus to flatten the panel segments in each clamp as the clamps are tightened.

5 Claims, 13 Drawing Sheets

DUAL AUTOMATED CLAMP CARRIER

CROSS-REFERENCE TO RELATED APPLICATIONS

This application is a continuation-in-part of application Ser. No. 07/656,226, abandoned which is a continuation-in-part of application Ser. No. 07/244,915 filed Sep. 14, 1988, now U.S. Pat. No. 4,952,269 which is a continuation of application Ser. No. 06/846,363, filed Mar. 31, 1986, now U.S. Pat. No. 4,778,555, issued Oct. 18, 1988.

BACKGROUND OF THE INVENTION

1. Field of the Invention

This invention relates to a device for automatically tightening and loosening clamps. The specific application of the invention is for clamps in a wood gluing machine; however, the structure and concepts of my invention are usable in any apparatus where clamps are to be tightened or loosened. In fact, the invention is not limited to the tightening or loosening of clamps, but may be used to automatically open and close any threaded nut.

2. Description of the Prior Art

U.S. Pat. No. 3,771,779, commonly assigned, discloses a wood gluing machine where a powered tightener for clamps is manually moveable into and out of engagement with a clamp.

U.S. Pat. No. 4,489,925, also commonly assigned, discloses a device for clamping a number of wood work pieces. That device has a number of clamp carriers or clamp frames. A plurality of clamps are mounted on each clamp frame or carrier. In operation, the wood pieces to be glued are placed within the jaws of the clamps on each clamp carrier and then a new clamp carrier is brought into operation by removing the wood with the glue having dried, and reinserting new glued pieces of wood therein.

The wood gluing art has long recognized the need to automate what, for many years, has been essentially a manual operation. The field involves the cutting and sizing of strips of wood which are then glued along their edges, clamped together, the glue being allowed to set, and the wooden panel thus formed removed for further processing. Examples of various machinery developed to automate the steps in this basic operation are shown in U.S. Pat. Nos. 4,374,165 and 4,062,320 commonly assigned, where equipment to automate the edge gluing of the strips of wood is disclosed.

The present invention represents an extension of the industry trend to automate various of the steps in the process and involves an apparatus which automatically tightens and loosens the clamp on the machine of the type shown in the aforementioned U.S. Pat. Nos. 4,489,925 and 3,771,779.

SUMMARY OF THE INVENTION

The invention disclosed and claimed in U.S. Pat. No. 4,778,555 utilizes an electronic sensor and programmable controller. The sensors detect the location of a clamp or other screw to be rotated. The unit is automatically shifted to that point and the rotating chuck is brought into engagement with the clamp. The chuck is driven until it reaches a stall condition at which time such condition is sensed, and the unit withdrawn and indexed to the location of the next clamp to be rotated. In the wood gluing apparatus where the invention has been utilized, the clamps are for the wood gluing machine of the type shown in U.S. Pat. No. 3,771,779 and 4,489,925. As shown therein, a series of clamps are employed to hold several work pieces (each of which consist of several pieces of wood to be glued together into a single unit). Specifically, the glued pieces are placed or stacked edge to edge for the desired width. A number of such pieces, 4–6 or 2–12 depending on size, are placed on a table-like configuration. Each of the sets may be loosely clamped into place by hand tightening. The automatic clamp tightener of the present invention serves to tighten the clamps sequentially firmly against the work piece.

On completion of the tightening, the entire array of tightened clamps are automatically indexed, as by rotation, with their associated work pieces, so that a new table-like surface is presented to the operator for processing. When the wood is sufficiently cured, it is ready for removal. The invention automatically loosens the clamps allowing the cured wood to be removed.

Again, the invention of U.S. Pat. No. 4,778,555 is not limited to clamps or to wood gluing. In brief, that invention employs an air driven rotating chuck or lug wrench of the type such as a Taylor 8000 or Ingersoll Rand 3840P. These devices, commercially available, are mounted for pivoting into and out of engagement with the clamp to be rotated. The entire pivotable unit rides on a frame which carries it laterally from stations to station. The rotating chuck pivots away or out of engagement with a clamp and the frame is indexed so that the entire unit pivots into engagement with the clamp and drives to stall to tighten, or, in the opposite direction, loosen the clamp.

The indexing and tightening mechanism of that invention, when used in gluing and clamp tightening for wood, employs an added step and structure which serves to first automatically flatten the various pieces of the wood panel, then tighten the clamp. This flattening structure includes two elongated arms which are dropped down onto the top surfaces of the stack of wooden pieces to flatten same and hold them in place. The clamp chuck then pivots and engages the clamps to sequentially tighten same. Thus, the work piece is held securely in place during the tightening and loosening of the clamp.

Additionally, the present invention provides an apparatus which enables three different activities to be conducted simultaneously at three different levels of the apparatus. The upper level is the location at which clamps previously tightened for gluing panels of wood are untightened automatically. The mid level is the location where the completed panels are removed from the clamps from the loosened clamps and panel segments coated with moist glue are positioned in the clamp for clamping and processing. The lower level is the location where the clamps are automatically tightened. Appropriate support elements for the upper and lower levels allow a carriage including a powered clamp tightener/loosener wrench to be automatically positioned to engage each of the clamps to loosen or tighten the clamps as necessary. The lower carriage also includes an apparatus to flatten the panel segments in each clamp as the clamps are tightened.

It is an object of the present invention to automatically tighten and loosen the clamps in a wood gluing machine.

Another object of the present invention is to speed up the throughput and/or productivity of a wood gluing process by providing automatic clamp opening and closing.

Another object of the present invention is the provision of an automatic clamp tightener for any type of clamp.

Another object of the present invention is the provision of an automatically indexed system for a stall operation lug wrench which locates the wrench at the desired locations.

Another object of the present invention is to provide a means for securely holding in place the work piece during the tightening of the clamp.

Another object of the present invention is to provide an automatic mechanism for supporting the work piece during adjustment of the clamp.

Another object of the present invention is the provision of a combined flattener for the work piece and the clamp tightener so that the work piece is automatically first flattened, then the clamps are tightened while the flattener maintains pressure on the top surface of the work piece.

Another object of the invention is to provide an automated clamp carrier which can perform several different activities simultaneously.

Still another object of the present invention is to provide an automated clamp carrier which can perform activities at different levels.

Yet another object of the present invention is to provide an automated clamp carrier which can tighten and loosen clamps at different work stations simultaneously.

A further object of the present invention to provide an automatic clamp carrier which can simultaneously perform sequential tightening and loosening activities on more than one series of clamps.

Another object of the present invention is to provide an automated clamp carrier which can have one operator simultaneously control two separate series or sequences of operations.

Still another object of the present invention is to provide an automated clamp carrier which is relatively space efficient for the amount of operations that it is conducting; which minimizes operator input, maximizes operator efficiency and which can be operated with a minimum of attention by an operator.

BRIEF DESCRIPTION OF THE DRAWINGS

These and further objects and advantages of the present invention will become apparent to those skilled in the art from review of the following specification and accompanying drawings in which.

DETAILED DESCRIPTION OF THE INVENTION

The present invention includes two subassemblies, a flattener subassembly and an air-driven tightener subassembly, both mounted on a frame. The frame is, in turn, mounted on a rail structure formed along the front or working position of the machine described in the U.S. Pat. No. 4,489,925. A motor is provided at one end of the rail which is coupled to the frame. The motor is capable of moving the frame along the rail and locating same at the desired position relative to the clamp and the work piece. The details of the frame and rail structure are described below in connection with FIGS. 5 and 6 below.

Figure 1:
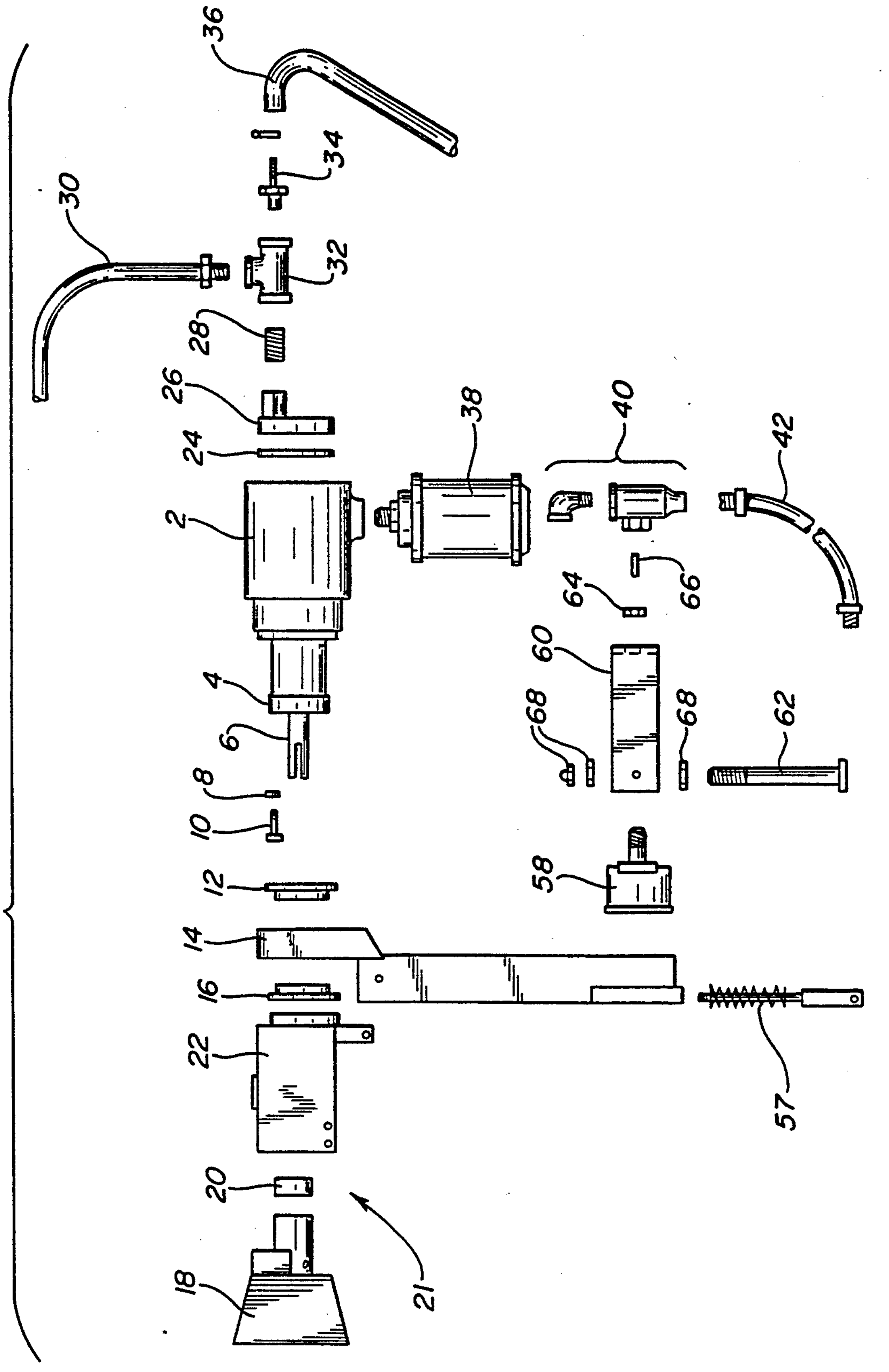
FIG. 1 is an exploded view of the air-driven rotating chuck and supporting structure of the present invention.

FIG. 1 is an exploded view of the clamp tightener and its mounting structure for one embodiment of the present invention. Note that FIG. 1 does not show the frame of the flattener and hold down mechanism for the work piece discussed above. FIG. 1 shows the pivoting tightener mounted for engagement with the clamps. More particularly, the tightener is shown at 2 having a rotating shaft 6 connected to a gear case shown generally at 4. A muffler 38 is coupled to the tightener 2 in standard fashion. The tightener is air driven and is connected to air line 36 via a tee 32. The usual gasket 24, back cap 26, and screw threaded elements 28 and 34 are employed with tee 32 to couple the air lines to the tightener 2. Hose 30 powers the flatteners.

A clamp engaging mechanism to engage, tighten and loosen the clamps is shown as comprising elements 8, 10, 12, 14, 16, 18, 20 and 22. More specifically, the yoke 22 engages the front jaw of the clamp to absorb torque. A rotating driver 18 for engaging the winged nuts on each clamp is mounted for engagement on bearing 20. A bracket 14 and support 12 and 16 are provided to support the wrench assembly. Bracket 14 is, in part, supported by spring 57. The entire unit is mounted on bracket 14.

The tightener is pivoted into and out of engagement via an air driven bladder shown at 58. More particularly, the bladder is coupled to the bracket 14 and on actuation, is filled with air to push the bracket and the tightener into engagement with the clamp. When the bladder is evacuated, gravity causes the tightener to tip backwards and fall out of engagement with the clamp to a predetermined position determined by stops on the bracket 14. The bladder 58 has supporting hardware 60, 62, 64, and 68 to connect it to an air valve 40 and an air line 42.

Figure 3:
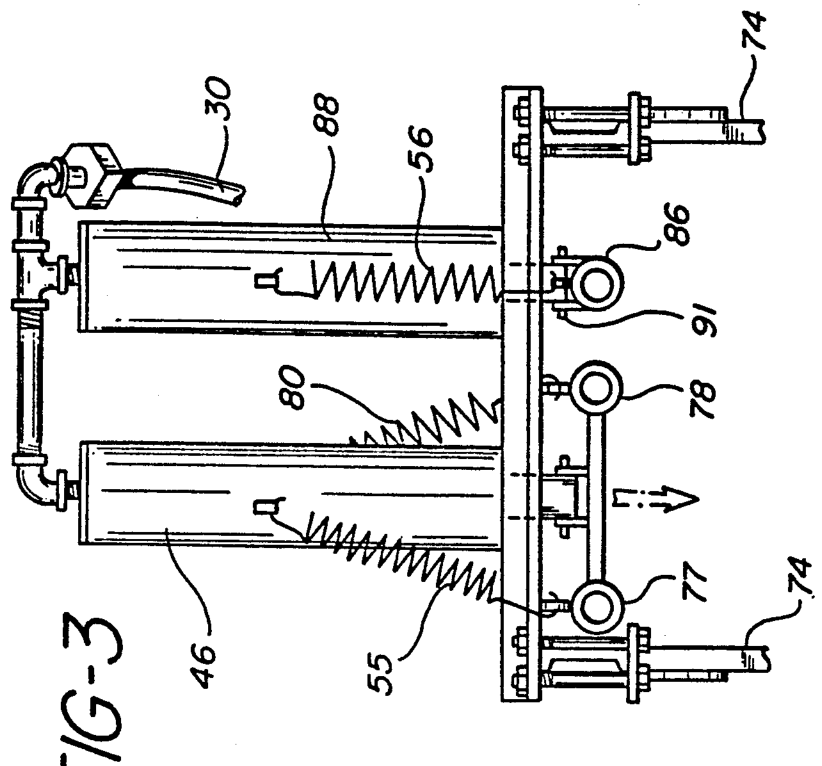
FIG. 3 is a end view of the flattener portion of FIG. 2.
Figure 2:
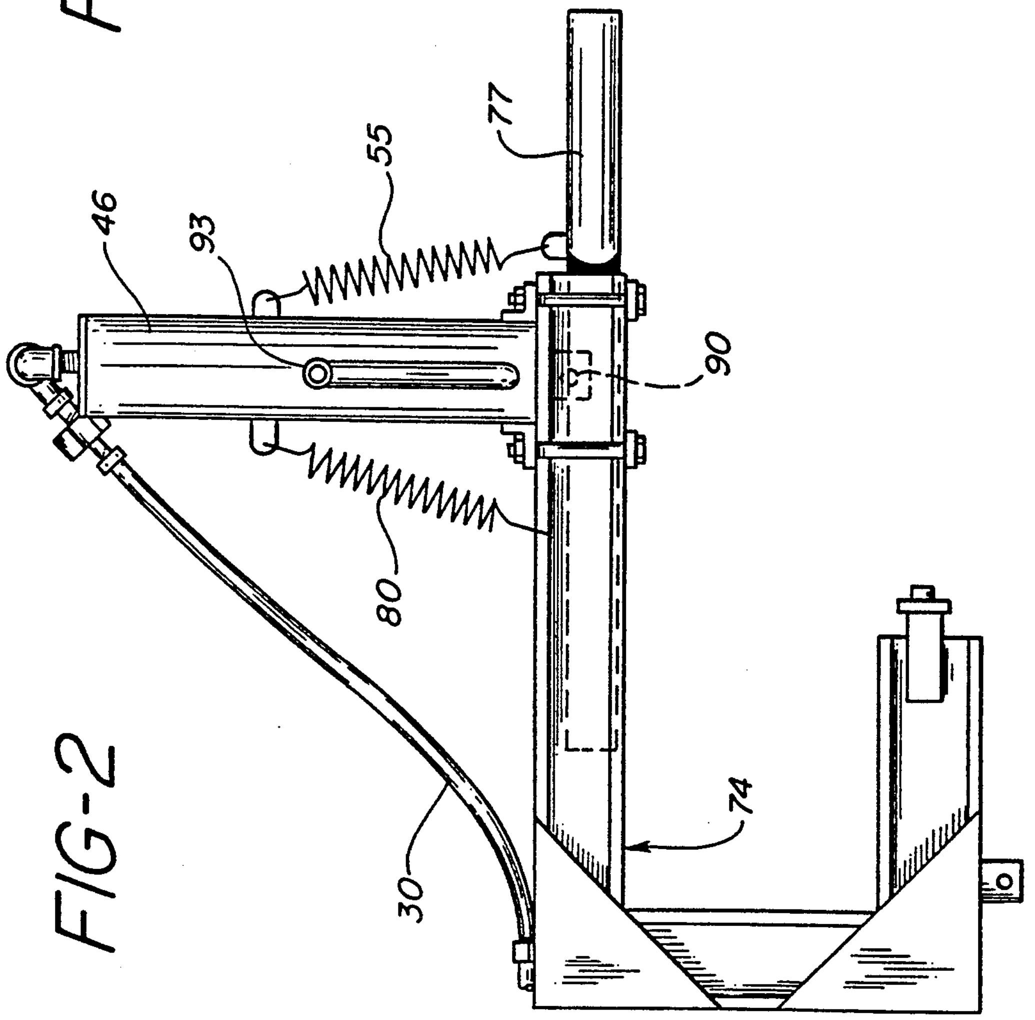
FIG. 2 is a side view of the flattener of the present invention on the slidable mounting frame.
Figure 5:
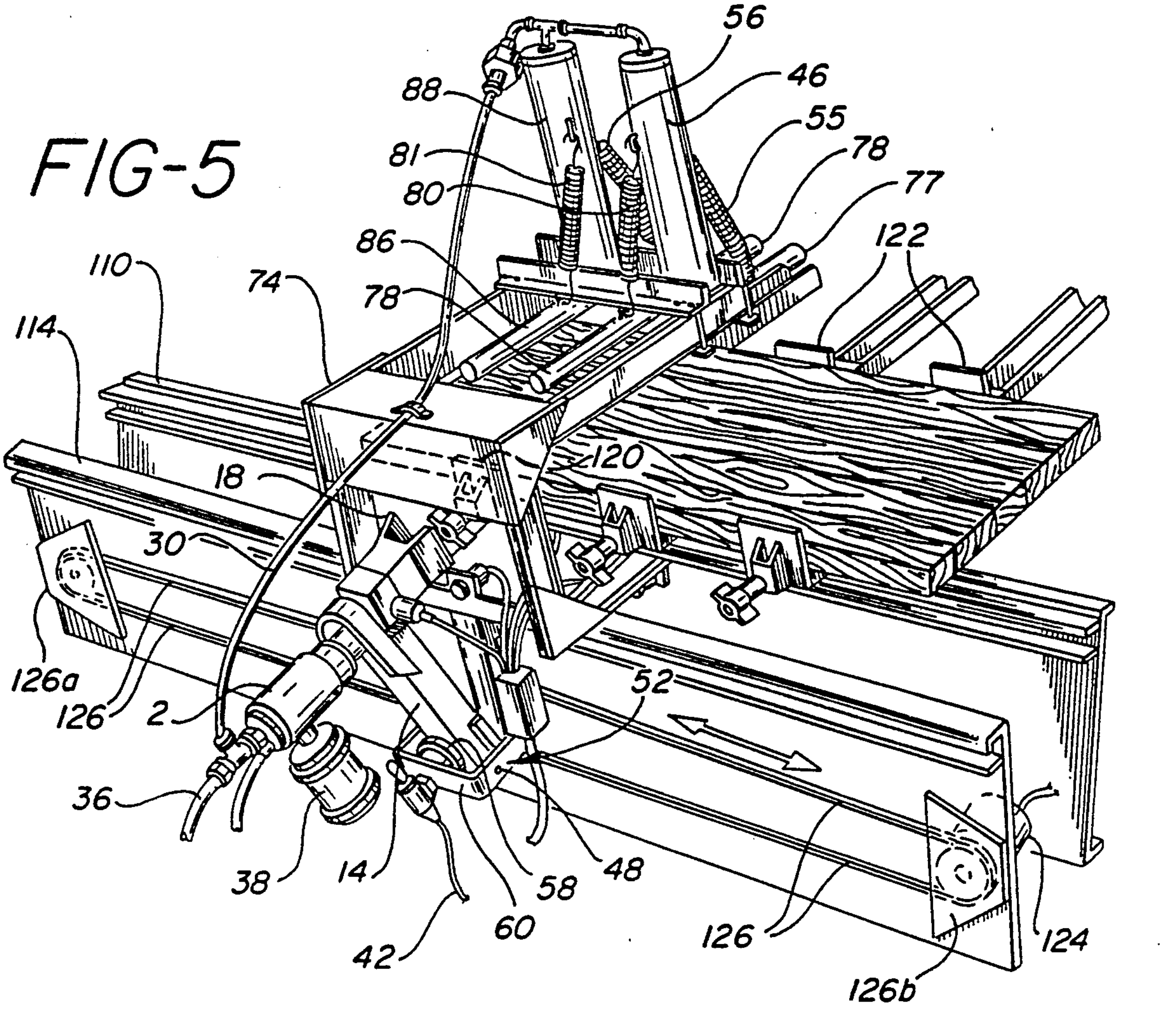
FIG. 5 is a perspective view of the subassemblies of FIGS. 1-3, mounted for operation.

FIG. 2 is a side view of the mounting and support for the work piece flattener mechanism. More particularly, two cylindrical bars 77 and 78 (shown in FIG. 3) are mounted on a pivot 90. Pivot 90 is connected to the piston of an air cylinder 46. On command, the air cylinder will fill, causing its piston to drop bars 77 and 78 into contact with the work piece to hold them down against the force of springs 55 and 80 during the tightening operation. FIG. 3 shows the mounting of the cylindrical bars 77 and 78 to the air cylinder 46. Another air cylinder, 88, is provided which drives a lead flattening shoe or cylindrical bar 86. This lead bar is actuated by air cylinder 88 and is connected by forward and rear springs 81 (as shown in FIG. 5) and 56 respectively. It has a pivot 91 in the same manner as hold down bars 77 and 78 are connected to the air cylinder by pivot 90. Both air cylinders 46 and 88 are actuated from the same air line 30 at the same time. Lead flattening shoe 86 is located approximately four inches from the forward flattening shoe 78 of the pair 77,78. The purpose of the lead flattening shoe is to hold down and align the wood in the next location to be flattened as well as to make sure that the wood is properly flattened by hold down bars or shoes 77 and 78. Note that forward and rear spring 80 and 55 are attached to different hold down bars as shown in FIG. 5 with the forward spring attached to hold down bar 78, while rear spring 55 is attached to hold down bar 77. This avoids an uneven pull being placed on the hold down bars by the action of these springs. The hold down bars are prevented from rotating by means of key 93 in the slot in the air cylinder 46. Springs 55 and 80 and 56 and 81 are provided to support the bars 77 and 78 and lead bar 86 and return them to their initial position when the air pressure is released. The entire hold-down assembly is mounted on bracket 74. As will be explained below, this bracket sequentially runs along a rail to carry with it the pivoting driver subassembly shown in FIG. 1 and the flattener hold down assembly discussed in connection with FIGS. 2 and 3.

Figure 4:
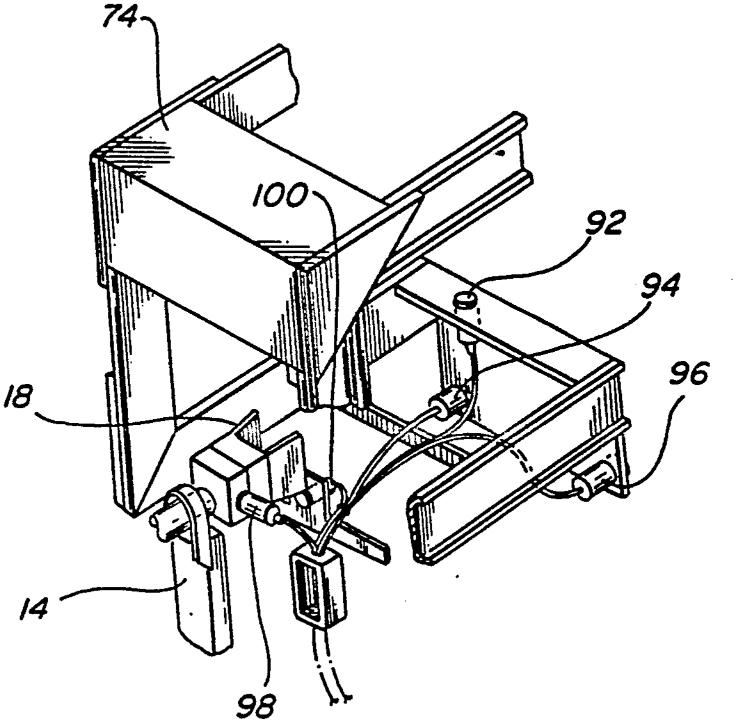
FIG. 4 is a perspective view of the sensors utilized to locate and otherwise control the flattener and the tightener of the present invention.

FIG. 4 shows the mounting of the various sensors needed to control the flattener hold-down device of FIGS. 2 and 3 and the pivoting fastener of FIG. 1. More particularly, in FIG. 4, various sensors are shown which, as will be subsequently described, feed a programmable control computer. The wood gluing embodiments of the invention utilizes five sensors. These sensors are proximity sensors manufactured by Industrie Elektronik GmbH, Lanterhein, Federal Republic of Germany, under model number 1AS-60-A14-S. Sensor 92 detects the clamp location. Sensor 94 and sensor 96 detect the end of travel for the unit at the left (for sensor 94) and the right (for sensor 96). Sensor 100 detects the tightener forward motion and the tightener will drive until stalled. A detection sensor 98 determines when the stall has occurred.

These five sensors serve as input to a programmable controller manufactured by Allen-Bradley, model number SLC-100. The program for the controller (programmed into the device in accordance with the manufacturer's instructions) is set forth in U.S. Pat. 4,778,555, which is incorporated by reference thereto. As can be seen, the functions are actions based on the sensing of one or more of the events which are indicated by one of the five sensors described in connection with FIG. 4 above.

FIG. 5 shows the bracket 74 mounting both the flattener subassembly and the tightener subassembly. The tightener subassembly as shown in FIG. 5 is pivoting on the base 52 of bracket 74 at pivot 48. As shown, the diaphragm or bladder 58 is mounted between arm 14 and fixed base 60. Base 60 is to provide a fixed reference point for inflatable bladder 58. As can now be seen, bladder 58 is inflated and forces arm 14 away from fixed point 60, thereby bringing the tightener shown at 2 into engagement with the clamp or, in general, the nut to be rotated.

Flattener arms 77 and 78 and lead flattener arm 86 are shown mounted laterally across the open top of frame 74. As can now be seen, the arms are forced down into engagement with the work surface as the clamp is being tightened. As shown in FIG. 5, cylindrical bars 77 and 78 are supported by springs 55 and 80. The second air cylinder, 46, is shown having its air line coupled directly to air cylinder 88 to drive lead flattener arm 86 supported by springs 81 and 56.

As will now be seen, the frame 74 can be slidably mounted or otherwise adjusted laterally to position itself relative to the clamp to be tightened.

This is accomplished by a motor 124 and connecting chains 126. The chains are connected to the support frame 74 to draw the support frame 74 along rail 114 from one side of the machine to the other, and then return to loosen clamps as desired. Numeral 120 in this Figure denotes a clamp to be tightened.

Figure 6:
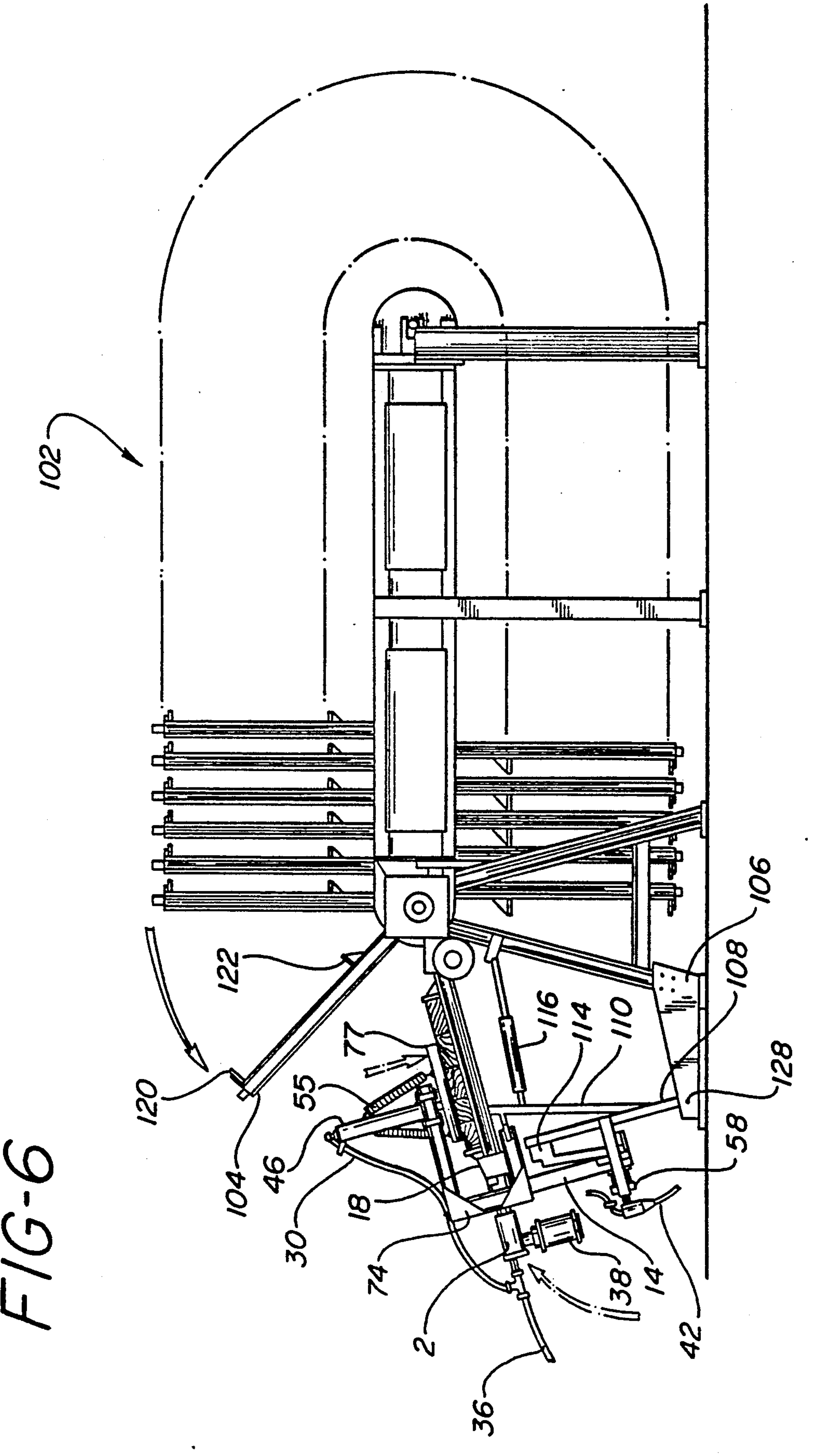
FIG. 6 is a diagrammatic view of the invention mounted for operation.

The entire operation of the device may be better understood in connection with FIG. 6, a diagrammatic view of the machine for supporting the wood pieces to be cured along with the mechanism of the present invention for tightening and loosening the clamps and for flattening the wood piece. More particularly, the machine is shown generally at reference numeral 102. The machine has a number of clamps 104 thereon each of which as stationary and movable jaws 120 and 122 respectively formed in sets. Jaw 120 is stationary whereas jaw 122 can be tightened or loosened. In FIG. 6, clamp 104 carrying jaws 120 and 122 is the next clamp to be brought into the working area.

The entire assembly which supports the automatic clamp tightener and the flattener must be indexed out of engagement with machine 102 if clamps 104 are to be capable of being brought into the working area. This is accomplished via base 106, air cylinder 116 and frame 110. These elements will permit the entire assembly to rotate out of the way of the clamps such as 104 to allow it to be brought into engagement with the work area. More particularly, base 106 has pivoted at pivot 128, the supporting rail 110. Air cylinder 116 allows rail 110 to pivot out of engagement with a clamp such as 104.

Note that elements 108, 110 are one piece and bolted together.

A further pivot at 128 is accomplished at arm 108. This arm allows rail to also pivot out of the way of clamp 104 on actuation of air cylinder 116.

Figure 4A:
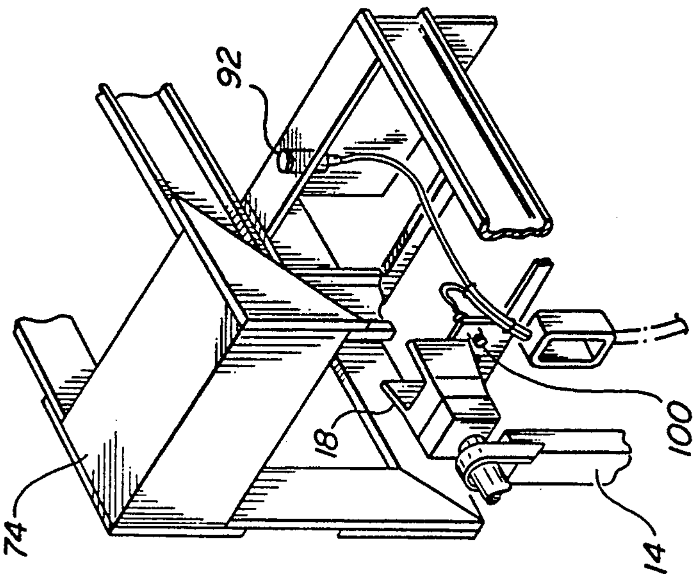
FIG. 4A is a perspective view of a modification of the device shown in FIG. 4.

The operations of the apparatus discussed in connection with FIGS. 4 and 5 can be modified so as to employ mechanical stops for end-left and end-right instead of the sensors 94 and 96 employed for that purpose. As shown in FIG. 4A, the structure employed is identical to that shown and described in FIG. 4 except that sensors 94 and 96 are eliminated. In this configuration, the chain shield guards 126*a* and 126*b* of FIG. 5 are employed as end-left and end-right mechanical stops for the lateral travel of the carriage 74. When the stops 126*a* and 126*b* are so employed, the motor 124 of FIG. 5 moves the carriage 74 to the stops 126*a* and 126*b* at the end of its travel.

When sensors 94 and 96 are not utilized, motor 124 may be designed as a stepping motor or a servo motor. With a stepping motor, the carriage 74 will stop near each end of rail 114 after making a predetermined number of steps from the other end. With a servo motor, the carriage 74 will stop near each end of the rail 114 by matching predetermined control voltages indicative of the right and left ends of travel.

Another modification illustrated in FIGS. 7–10 relates to the clamp tightener. In these figures, the tightener is designed to tighten the clamp in several different modes (in addition to driving the tightener to stall as discussed in connection with FIG. 5). These modes include tightening the clamp for a predetermined period of time, or tightening the clamp until a predetermined torque or a predetermined strain is sensed in the clamp. With these later approaches, sensor 98 of FIG. 4 is eliminated (as shown in FIG. 4A).

Figure 7:
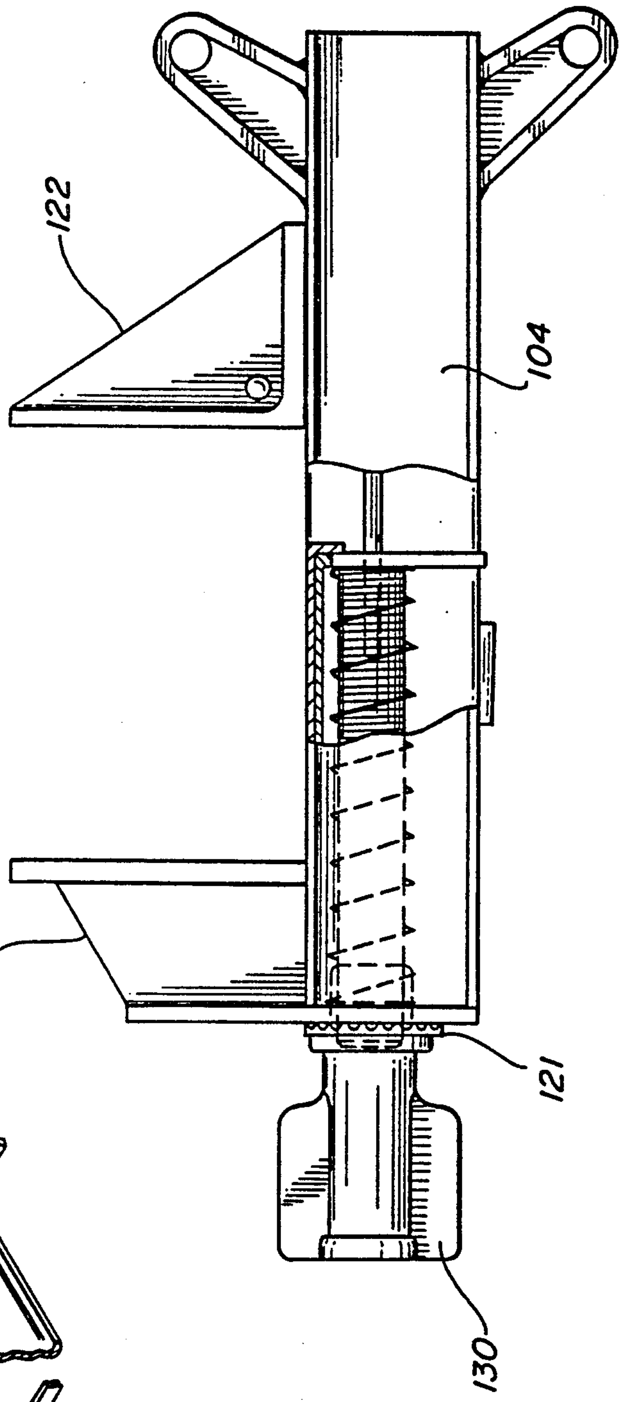
FIG. 7 is a side view, partially in section, of a clamp assembly for use in a modified form of the invention.
Figure 8:
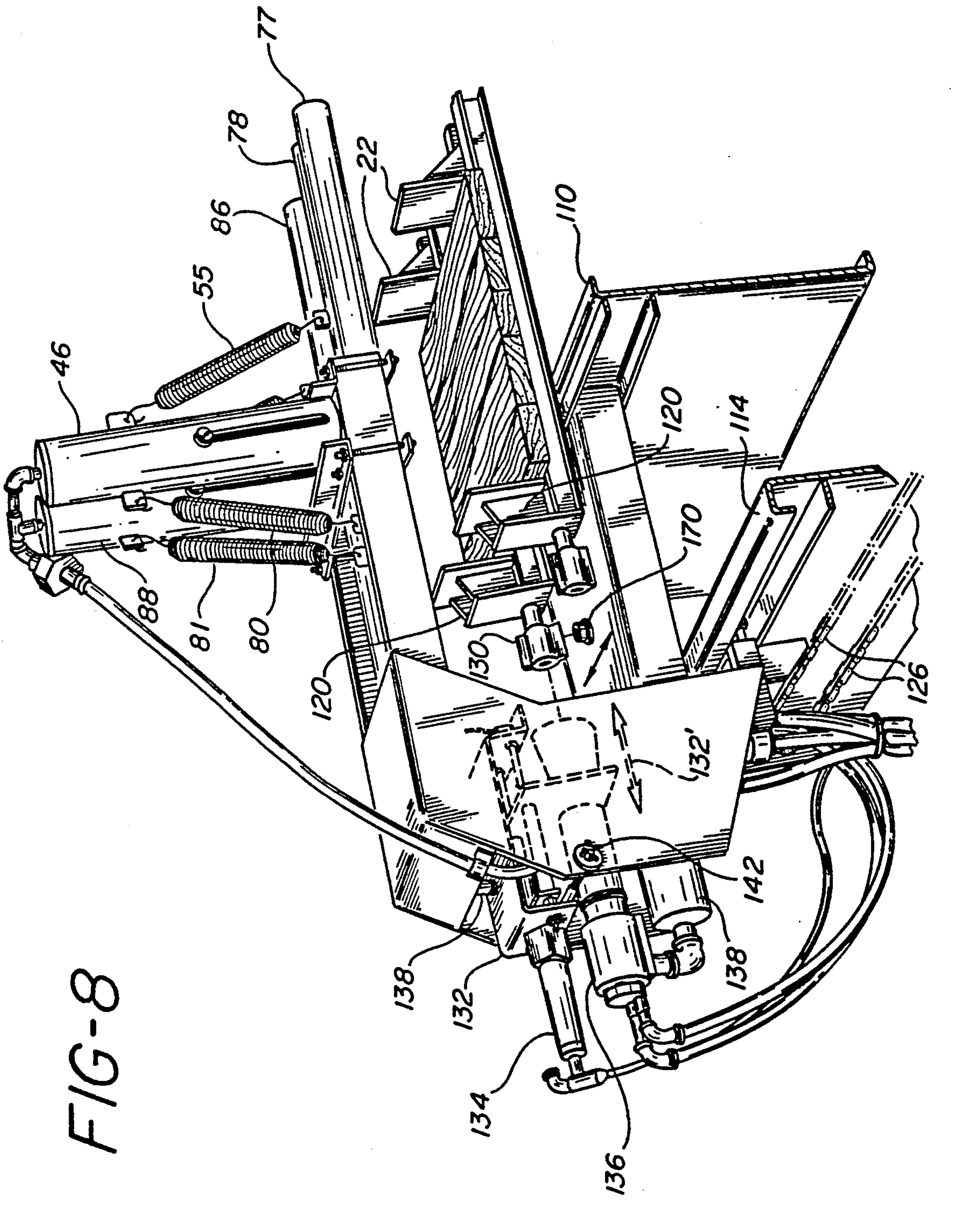
FIG. 8 is a perspective view of a modification of the devices shown in FIGS. 1, 4, 4A, and 5.

Referring now to FIG. 8 a modification of the apparatus of FIG. 5 is shown. This modification involves the elimination of the bladder 58 and associated parts so that the powered tightener 2 need not pivot into and out of engagement with the clamp to be adjusted. In FIGS. 5 and 8, like reference numerals have been used to designate like parts. Thus, in FIG. 8, the cylinders 46 and 88, springs 55 and 80–81, and hold-down bars 77–78 and 86 are identical to the corresponding elements described in connection with FIG. 5. The pieces of wood to be glued together are clamped between front jaws 120 and rear jaws 122 of clamps of the type shown in more detail in FIG. 7. In the same manner as described in connection with FIG. 5, supporting rails 110 and 114 mount the carriage 74.

The difference between FIG. 8 and FIG. 5 resides in the construction of the mounting of the air driven tightener. In FIG. 8, the tightener 136 is connected to muffler 138 and is slidably suspended from a support 132. As will be understood with reference to FIGS. 9 and 10, the tightener is moved into and out of engagement with the tightening nuts on the clamps under control of an air driven cylinder attached to support 132 which causes tightener 136 to move in the direction of the arrow 132′ shown in FIG. 8.

Figure 9:
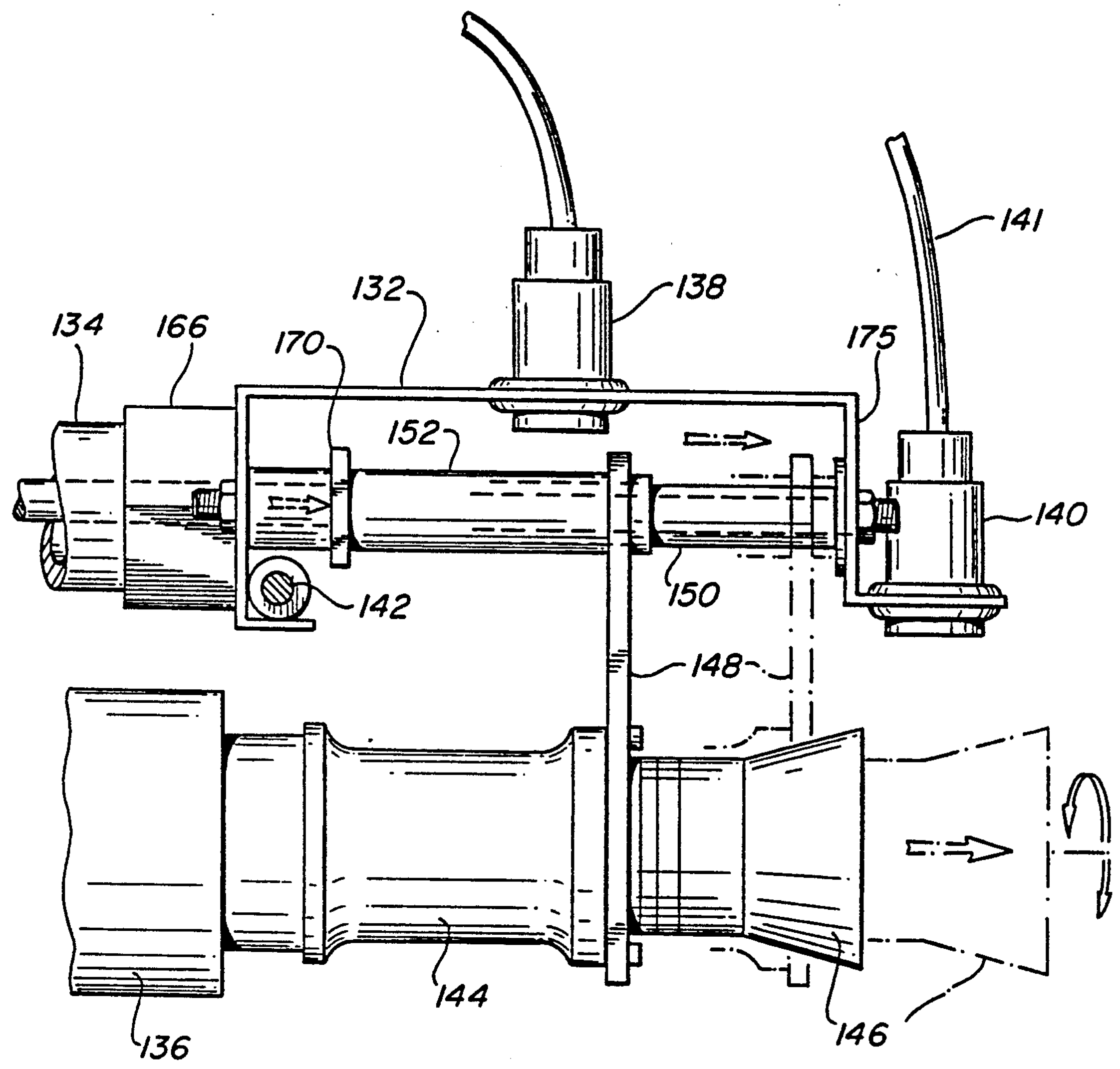
FIG. 9 is a side view of a portion of the modification shown in FIG. 8.
Figure 10:
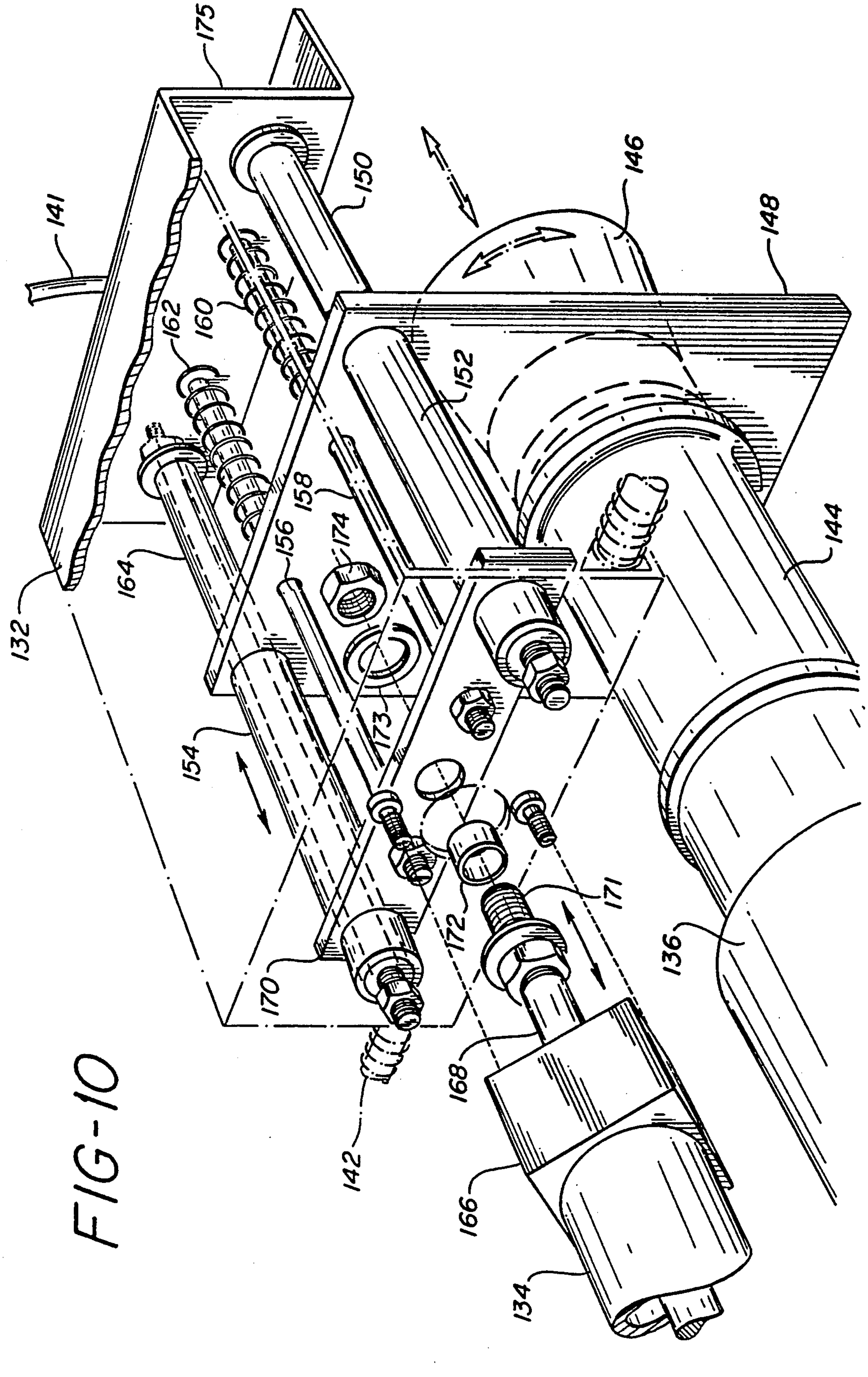
FIG. 10 is a perspective view of another portion of the modification shown in FIGS. 8-9.

The suspension system for the air driven tightener 136 is shown in detail in FIGS. 9–10. The system is mounted on support 132 and includes a vertically suspended plate 148. The plate 148 is slidably mounted on two rod assemblies, 154/164 and 152/150. These rod assemblies include smaller diameter cylinders 150 and 164 which interfit into larger diameter cylinders 152 and 154. Both sets of cylinders 154/164 and 152/150 are mounted on respective rods which are connected between the vertical walls of support 132. An air driven piston assembly 134 and 166 is connected to drive rod 168 horizontally. Rod 168 is connected to a bar 170 via connectors 171, 172, 173 and 174. Bar 170 is also connected to ride on cylinders 152 and 154. Lateral movement of shaft 168 thus causes plate 148 to move horizontally and thereby, cylinders 152 and 154 onto rods 150 and 164. This movement causes lateral movement of support plate 148 and thereby, lateral movement of rotating chuck 146.

The movement of the plate 148 is against the bias of compression springs 160 and 162. These springs are mounted on rods 158 and 156 which are connected between the bar 170 and the vertical rear wall 175 of support 132. Proximity sensors 138 and 140 are mounted on support 132 to detect the position of the tightener.

For strain sensing, FIG. 7 shows a clamp 104 (which is the same clamp 104 shown in FIG. 6), employing front jaw 120 and rear jaw 122. A tightening nut 130 is connected to the front of clamp 104. When the tightener engages the clamp 104 and starts to tighten the nut 130, a bellville washer 121, or other suitable collapsible member is gradually compressed as the nut 130 is tightened and the clamp increases its clamping force on the wood. A sensor is mounted on wrench mount towards the front jaw 120 and clamp 104 and stops the tightening and/or commences disengagement when the clamping force has reached a preset amount. The bellville washer 121 is mounted between the tightening nut of the clamp 104 and the front jaw 120 of clamp 104.

All of the sensors used in FIGS. 7–10 are the same proximity sensors used in FIG. 4.

The program for the controller of the invention operating in accordance with the embodiment of FIGS. 8–10 is set forth in Appendix A.

Figure 11:
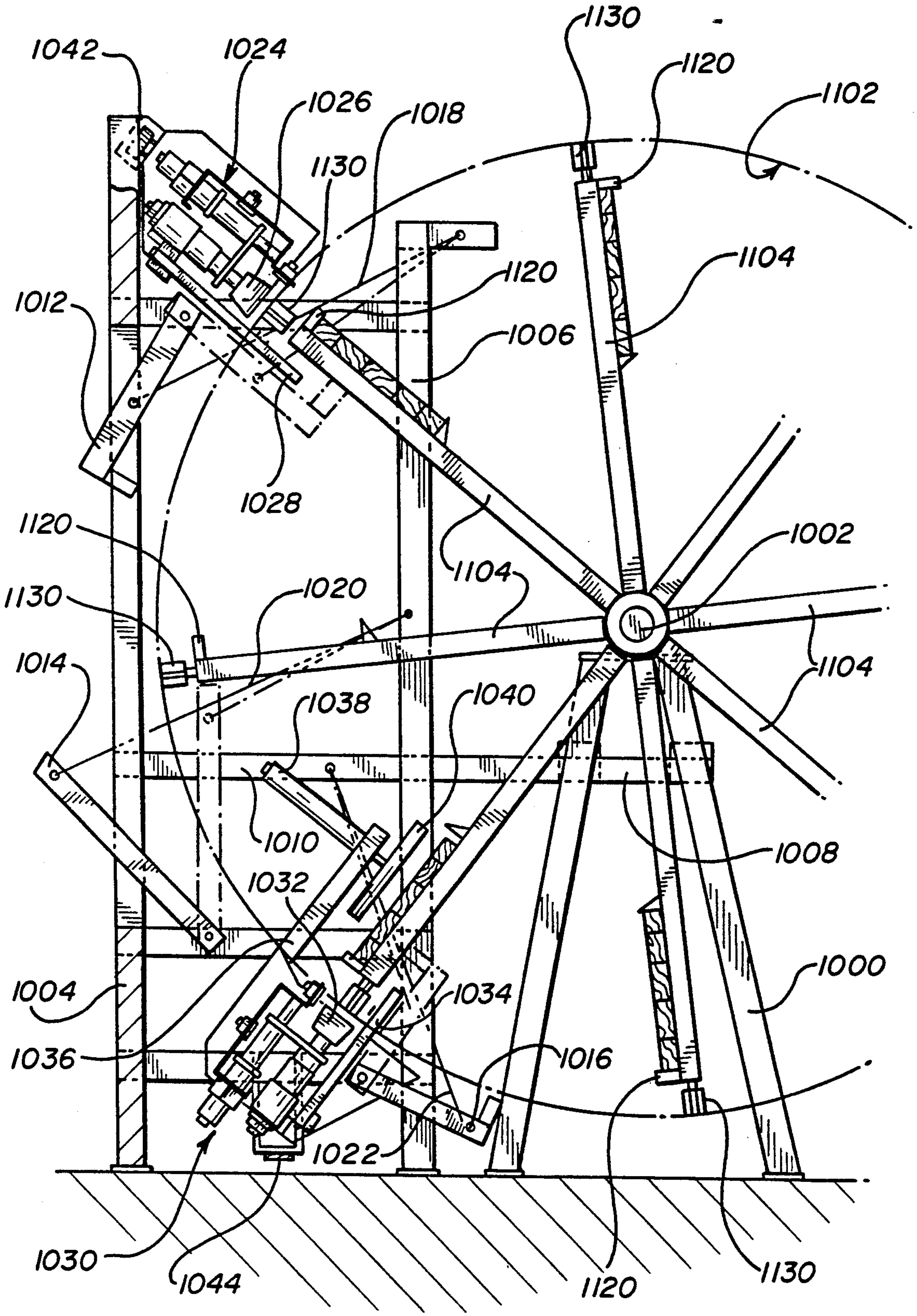
FIG. 11 is a schematic representation of a dual automated clamp carrier showing the major components in schematic relation in three levels of activity.
Figure 12:
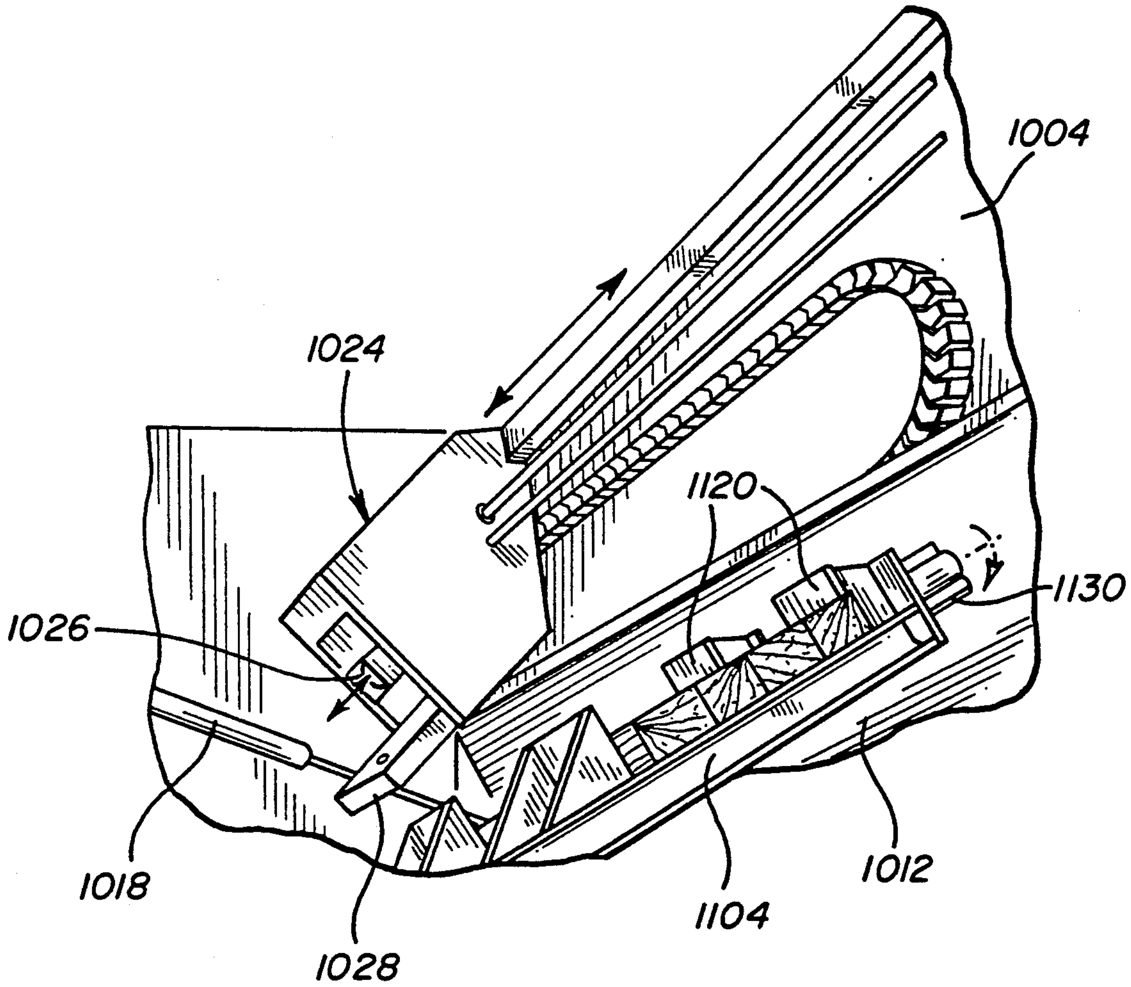
FIG. 12 a figure showing the upper carriage in operation during a portion of its operating sequence.
Figure 13:
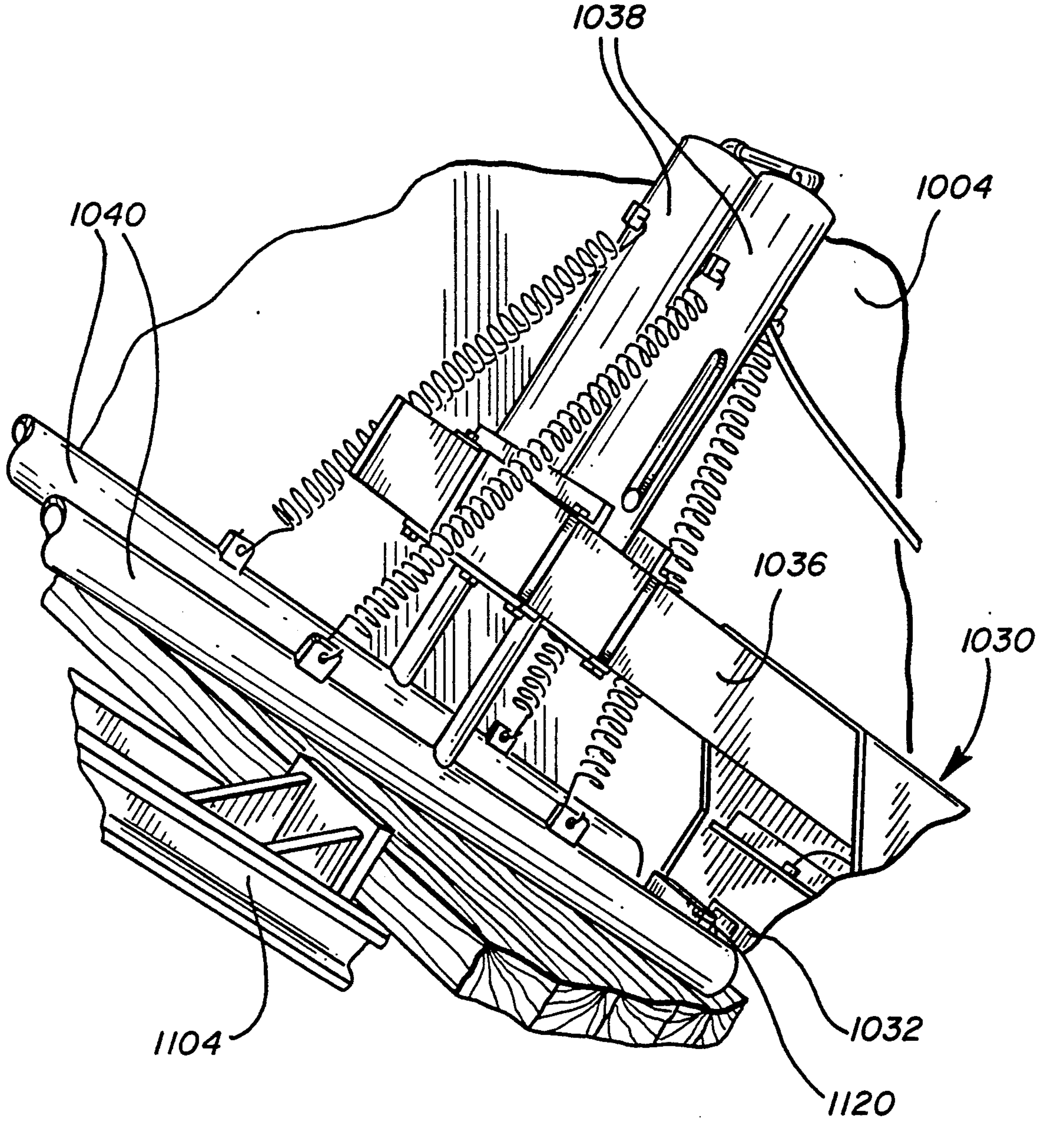
FIG. 13 is a figure showing the lower carriage in operation during a portion of its operating sequence.
Figure 14:
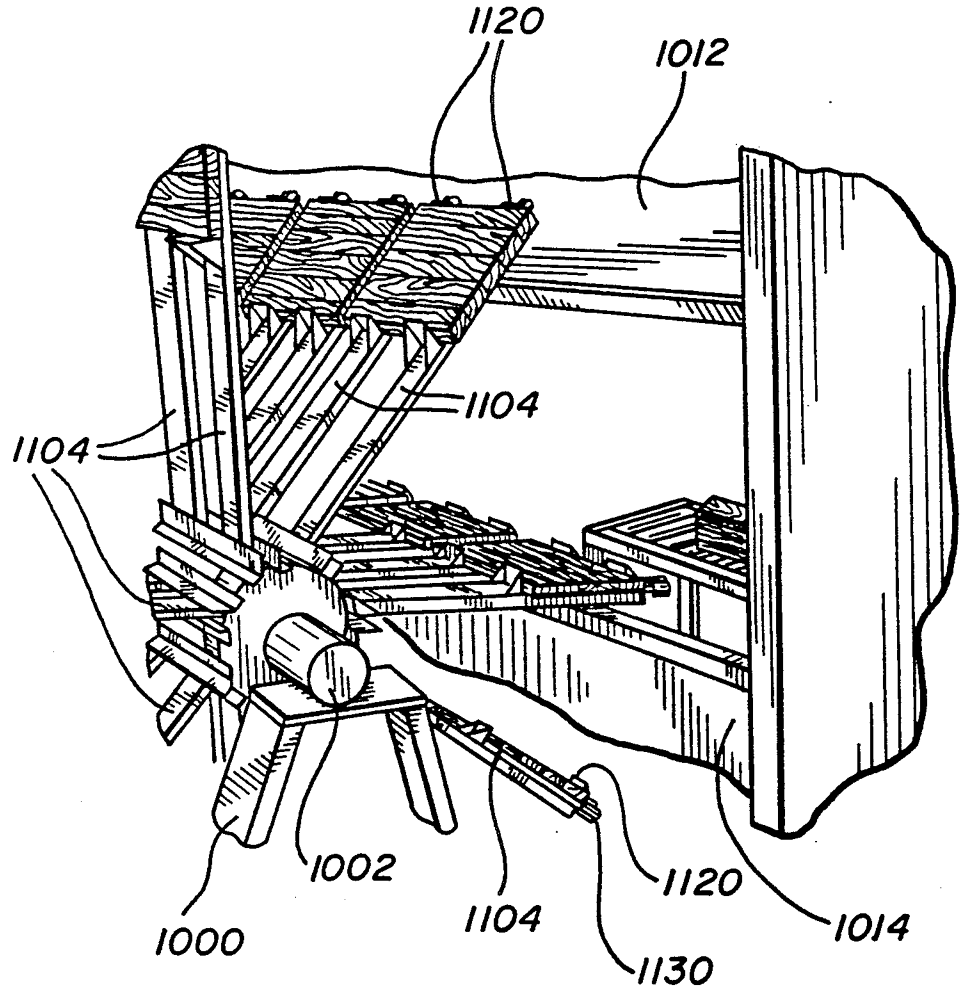
FIG. 14 is a view showing the clamps in the work station with the support rails withdrawn to support the clamps.
Figure 15:
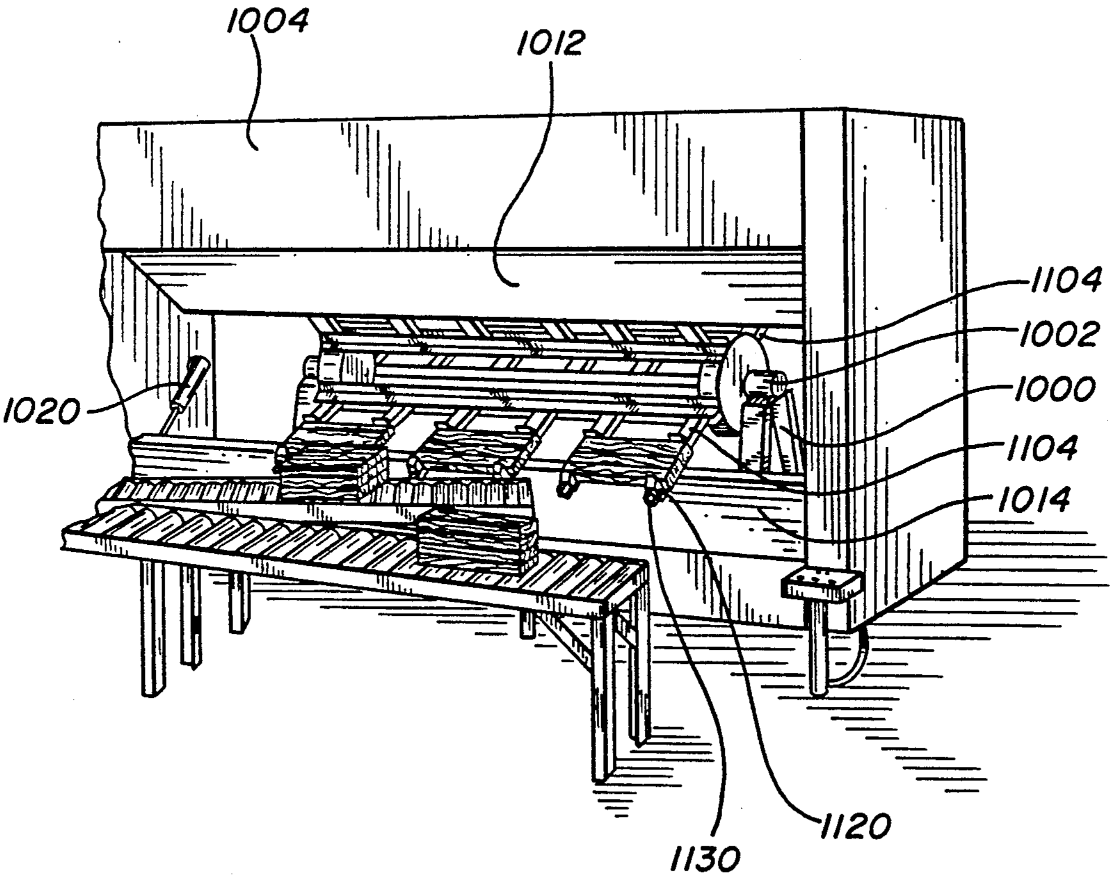
FIG. 15 a view of the apparatus showing the support rails extended to allow movement of the clamps.

FIG. 11 is a schematic representation of the dual auto clamp carrier performing activities on three levels; an upper, a mid and a lower level. In the upper level, the clamps bearing panels of wood which have been processed are loosened by a transversely moving upper carriage which carriage holds the wrench and air motor apparatus for loosening the clamps. This carriage and the manner of operation of the wrench are similar to that shown in the previous embodiments of the invention. This is a linear type of wrench that is moved into and out of engagement with the nut of the clamp when the wrench is properly positioned in front of the nut.

In the mid level of the apparatus, the loosened clamps are supported while the panels are removed from the clamps and pre-glued segments of wood to form new panels by clamping are placed in the opened clamps. This is normally done manually by an operator who merely lifts the completed panels out and then stacks the new panel segments into the clamp.

In the lower level the clamps are tightened by a transversely moving carriage in much the same manner as in the upper level and in previous embodiments. Similar to previous embodiments and when tightening the clamps, in the lower level a flattener apparatus is connected to the lower carriage which flattener apparatus includes a cylinder which actuates flattener shoes to press the panels segments into proper alignment prior to clamping.

Sensors coacting with a programmable controller coordinate the rotation of the clamp racks to the upper mid and lower position, the movement of upper mid and lower support rails which allow the rotation of the clamp carriers and also provide support for the clamp carriers during various portions of the operating sequence, and the sensors also as in the previous embodiment arrange for the positioning of the upper and lower transversely moving carriages with relation to the clamp carriers during the operating cycle.

More particularly as shown in FIG. 11, the clamp carrier are supported by a frame 1000 and rotate about an axis 1002. The clamp carriers 1104 have front jaws 1120 and nuts 1130 similar to the clamp carrier shown in the previous embodiments. They rotate in a counter clockwise direction. The clamps can be stacked in a long series of stacks similar to that shown FIG. 6. However, for purposes of explanation here they are shown as being mounted on a stationary axis and merely in a clock-like arrangement to indicate the sequence of operation.

The apparatus has a front column 1004 and a rear column 1006. These columns are connected by means of locator struts 1008 for the rear column to the frame 1000 and the locator strut 1010 for the front column 1004 to the rear column 1006. The purpose of these struts is to accurately position these columns to allow for proper swing of the clamps 1104 and the positioning of the mid-clamps with relation to the support rails for the clamps and the carriages which transversely move the wrenches and flattener with relation to the clamps during the loosening and tightening operation.

The upper level work station at which the nuts 1130 on the clamps 1104 are loosened is shown at approximately the 10 o'clock position. An upper clamp rail 1012 is connected to the rear column 1006 by means of an air cylinder schematically shown by line 1018 whose air supply can be controlled via the programmable controller in the same way that the cylinders in the previous embodiment were shown. When the clamps are rotating the support rail 1012 is pivoted beyond the circumference of the circle of movement of the nuts of the clamp to allow free passage. When the clamp to be loosened reaches the 10 o'clock position the rotation will stop and the cylinder will contract bringing the support rail 1012 into the upper position shown. At that point the upper carriage generally indicated at 1024 will now be brought into play. The upper carriage is also supported by means of a rail of assembly fastened into a stationary rail connected to the front column generally identified as 1042. During movement of the rails this carriage is positioned either to the extreme left or the extreme right of the housing beyond the path of movement of the clamps. Once the clamps are stationary the housing will then traverse the path of movement and moving into and out of the plane of the paper in a manner similar to shown in the previous embodiments, it will sense each clamp, stop at the clamp, the wrench will be advanced to engage the nut, and it will back off the nut. The carriage includes the wrench 1026 and also a bottom frame 1028 which will engage a groove in the end of the clamp rail with rollers at the end of frame 1028 so that the carriage can traverse easily its entire path until it extends beyond the end of the support rail and is again put into a "parked" position and out of the line travel of the clamps. The carriage can operate to loosen clamps traveling in either direction from left to right or from right to left.

While the one set of clamps is positioned at 10 o'clock for processing by the upper carriage, the second or mid-level of clamp roughly positioned at the 9 o'clock position is supported by the mid-clamp rail 1014 which is actuated by the cylinder schematically shown as 1028 connected to the rear column. This allows the end of clamps 1104 to rest on the top of the support rail 1014 while the operator removes the processed panels from the loosened clamp and stacks pre-glued segments of wood into the opened clamps for tightening and further processing. When the clamps are to be moved, the mid-clamp rail 1014 moves counter clockwise out of position.

While the top and mid-level clamps are positioned at 10 and 9 o'clock, the third or lower level clamps are positioned at approximately 8 o'clock, and in this location the clamps with the panel segments are tightened by the lower carriage. The carriage very much resembles the apparatus shown in the previous embodiment. It includes an air motor with a wrench which tightens the nuts as the nuts are sensed by positioning sensors such as proximity sensors as in the previous embodiment on the carriage as it traverses from side to side. Additionally, the lower carriage 1030 has a wrench 1032 and includes a bottom frame 1034 which engages with a track or groove in the bottom or lower clamp rail 1016 in the same manner as occurred in connection with the upper carriage. The lower clamp rail 1016 is only shown in one position in the schematic drawing, mainly the position out of the path of travel the clamps, for purposes of clarity.

The lower carriage also includes a flattener frame 1036 on which is mounted a pair flattener cylinders 1038 and a pair of flattener shoes 1040 which coact with the operation of the wrench 1032 to flatten the wood in proper sequence with the tightening of a clamp. The carriage also is supported by a bottom end rail 1044 which is stationary and out of the path of travel of the clamps. The lower carriage also has parking positions at that extreme right and extreme left of the apparatus which are out of the path of the clamps as they rotate so that after the carriage has traversed the entire set of clamps it moves to its "parking" position. The program for the controller of the invention operating in accordance with the embodiments of FIGS. 11-15 is set forth in Appendix B.

While several embodiments of the invention have been illustrated and described, it is apparent that many other variations may be made in the particular design and configurations shown herein without departing from the scope of the invention set forth in the appended claims.

APPENDIX A

BEST AVAILABLE COPY

```
                                                        0
TIMER 901 TO .3                                701      901
                                     9    ---|/|-----(RST)--
                                                        0
                                               701      901
                                     10   ---| |-----(RTO)--
                                                        .3
GOTO NEXT IF 901 AND NOT SENSECLAMP            701      901       5         702
                                     11   ---| |------| |------|/|------(L)
                                               702      701
                                     12   ---| |------(U)---
GOTO ROTATECARRIER IF SENSERIGHTSTOP           701      101       713
                                     13   ---| |------| |------(L)---
                                               713      701
                                     14   ---| |------(U)---

: A TRAVERSE UNTIL SENSE CLAMP.  SKIP
   CLAMP IF BUTTON IS HELD DOWN
GOTO NEXT IF SENSECLAMP AND NOT SENSE
  TIGHTENBUTTON                                703      5         1         703
                                     15   ---| |------| |------|/|------(L)
                                               703      702
                                     16   ---| |------(U)---
GOTO ROTATECARRIER IF SENSERIGHTSTOP           702      101       713
                                     17   ---| |------| |------(L)---
                                               713      702
                                     18   ---| |------(U)---

TIGHTENCLAMP:
   UNLATCH RIGHTTRAVERSE                       703      114
                                     19   ---| |------(U)---
   UNLATCH WRENCHCCW                           703      13
                                     20   ---| |------(U)---
   LATCH WRENCHCW                              703      14
                                     21   ---| |------(L)---
   LATCH WRENCHFORWARD                         703      15
                                     22   ---| |------(L)---
   RESET 904 TO 0                              703      904
                                     23   ---| |-----(RST)--
                                                        0
   RESET 908 TO 0                              703      908
                                     24   ---| |-----(RST)--
                                                        0
   TIMER 902 TO 1.5                            703      902
                                     25   ---|/|-----(RST)--
                                                        0
                                               703      902
                                     26   ---| |-----(RTO)--
                                                        1.5
   GOTO NEXT IF 902                            703      902       704
                                     27   ---| |------| |------(L)---
                                               704      703
                                     28   ---| |------(U)---

   GOTO CONTINUETIGHTENCLAMP IF SENSEWRE
     NCHFORWARD                                703      102       705
                                     29   ---| |------| |------(L)---
                                               705      703
                                     30   ---| |------(U)---

   : A RELAX WRENCH, WAIT 1 SECOND AND T
```

BEST AVAILABLE COPY

```
RY AGAIN
UNLATCH WRENCHFORWARD                       704       15
                                     31  ---| |------(U)---

UNLATCH WRENCHCW                            704       14
                                     32  ---| |------(U)---

COUNT 927 TO 5                              704       927
                                     33  ---| |-----(CTU)--
                                                      5

TIMER 903 TO 1.0                            704       903
                                     34  ---|/|-----(RST)--
                                                      0
                                            704       903
                                     35  ---| |-----(RTO)--
                                                      1.0

GOTO TIGHTENCLAMP IF 903                    704       903         703
                                     36  ---| |------| |------(L)---
                                            703       704
                                     37  ---| |------(U)---

GOTO STOPMACHINE IF 927                     704       927         730
                                     38  ---| |------| |------(L)---
                                            730       704
                                     39  ---| |------(U)---

CONTINUETIGHTENCLAMP: A FLIP FLOP BETWEE
    N STATES UNTIL DRIVER STALLS
  TIMER 905 TO .5                           705       905
                                     40  ---|/|-----(RST)--
                                                      0
                                            705       905
                                     41  ---| |-----(RTO)--
                                                      .5

  COUNT 904 TO 4                            705       904
                                     42  ---| |-----(CTU)--
                                                      4

  GOTO NEXT IF SENSEDRIVER                  705       104         706
                                     43  ---| |------| |------(L)---
                                            706       705
                                     44  ---| |------(U)---

  GOTO STALLED IF 905                       705       905         707
                                     45  ---| |------| |------(L)---
                                            707       705
                                     46  ---| |------(U)---

  GOTO SCREWPROTRUSION IF NOT SENSEWREN
    CHFORWARD AND 904                       705       102         904         70
                                     47  ---| |------|/|------| |------(L
                                            708       705
                                     48  ---| |------(U)---

  :
  TIMER 906 TO .5                           706       906
                                     49  ---|/|-----(RST)--
                                                      0
                                            706       906
                                     50  ---| |-----(RTO)--
                                                      .5

  GOTO CONTINUETIGHTENCLAMP IF NOT SENS
    EDRIVER                                 706       104         705
                                     51  ---| |------|/|------(L)---
                                            705       706
                                     52  ---| |------(U)---

  GOTO NEXT IF 906                          706       906         707
                                     53  ---| |------| |------(L)---
                                            707       706
                                     54  ---| |------(U)---
```

BEST AVAILABLE COPY

```
STALLED:
   UNLATCH WRENCHCW                               707       14
                                          55   ---| |------(U)---
   UNLATCH WRENCHFORWARD                          707       15
                                          56   ---| |------(U)---
   TIMER 907 TO .3 IF NOT SENSEWRENCHFOR
     WARD                                         707       907
                                          57   ---|/|-----(RST)--
                                                            0
                                                  707       102       907
                                          58   ---| |------|/|-----(RTO)--
                                                                      .3
   GOTO TIGHTEN IF 907                            707       907       701
                                          59   ---| |------| |------(L)---
                                                  701       707
                                          60   ---| |------(U)---

SCREWPROTRUSION:
   UNLATCH WRENCHCW                               708       14
                                          61   ---| |------(U)---
   LATCH WRENCHCCW                                708       13
                                          62   ---| |------(L)---
   UNLATCH RUNLIGHT                               708       16
                                          63   ---| |------(U)---
   LATCH ADJUSTJAWLIGHT                           708       112
                                          64   ---| |------(L)---
   GOTO NEXT IF SENSEWRENCHFORWARD                708       102       709
                                          65   ---| |------| |------(L)---
                                                  709       708
                                          66   ---| |------(U)---

   :
   COUNT 908 TO 22 IF SENSEDRIVER                 709       104       908
                                          67   ---| |------| |-----(CTU)--
                                                                      22
   GOTO NEXT IF 908                               709       908       710
                                          68   ---| |------| |------(L)---
                                                  710       709
                                          69   ---| |------(U)---
   GOTO TIGHTENCLAMP IF NOT SENSEWRENCHF
     ORWARD                                       709       102       703
                                          70   ---| |------|/|------(L)---
                                                  703       709
                                          71   ---| |------(U)---

PROTRUSION2:
   UNLATCH SAFETYBEAMISENABLED                    710       060
                                          72   ---| |------(U)---
   UNLATCH WRENCHFORWARD                          710       15
                                          73   ---| |------(U)---
   UNLATCH WRENCHCCW                              710       13
                                          74   ---| |------(U)---
   TIMER 909 TO .3 IF NOT SENSEWRENCHFOR
     WARD                                         710       909
                                          75   ---|/|-----(RST)--
                                                            0
                                                  710       102       909
                                          76   ---| |------|/|-----(RTO)--
                                                                      .3
   GOTO NEXT IF 909                               710       909       711
                                          77   ---| |------| |------(L)---
                                                  711       710
                                          78   ---| |------(U)---
```

BEST AVAILABLE COPY

```
: A GET PASSED CLAMP
LATCH LEFTTRAVERSE
                                            711       113
                                    79   ---| |------(L)---
TIMER 910 TO .5
                                            711       910
                                    80   ---|/|-----(RST)--
                                                       0
                                            711       910
                                    81   ---| |-----(RTO)--
                                                      .5
GOTO NEXT IF 910 AND (SENSELEFTSTOP O
  R SENSECLAMP)
                                            711       910                 6
                                    82   ---| |------| |------(   ------| |
                                            712       711
                                    83   ---| |------(U)---

: A WAIT FOR START BUTTON
UNLATCH LEFTTRAVERSE
                                            712       113
                                    84   ---| |------(U)---
GOTO TIGHTEN IF SENSETIGHTENBUTTON
                                            712       1          701
                                    85   ---| |------| |------(L)---
                                            701       712
                                    86   ---| |------(U)---

ROTATECARRIER:
UNLATCH RIGHTTRAVERSE
                                            713       114
                                    87   ---| |------(U)---
LATCH REVERSECARRIERROTATION
                                            713       11
                                    88   ---| |------(L)---
TIMER 911 TO .3
                                            713       911
                                    89   ---|/|-----(RST)--
                                                       0
                                            713       911
                                    90   ---| |-----(RTO)--
                                                      .3
GOTO NEXT IF 911
                                            713       911        714
                                    91   ---| |------| |------(L)--
                                            714       713
                                    92   ---| |------(U)---

: A WAIT FOR FRONT REST TO COME OUT
UNLATCH REVERSECARRIERROTATION
                                            714       11
                                    93   ---| |------(U)---
TIMER 912 TO 2.2
                                            714       912
                                    94   ---|/|-----(RST)--
                                                       0
                                            714       912
                                    95   ---| |-----(RTO)--
                                                      2.2
GOTO NEXT IF 912
                                            714       912        715
                                    96   ---| |------| |------(L)---
                                            715       714
                                    97   ---| |------(U)---

: A ROTATE FORWARD 1 SECOND BEFORE SE
 NSING FOR CAM
LATCH FORWARDCARRIERROTATION
                                            715       12
                                    98   ---| |------(L)---
TIMER 913 TO 1.0
                                            715       913
                                    99   ---|/|-----(RST)--
                                                       0
                                            715       913
                                    100  ---| |-----(RTO)--
                                                      1.0
GOTO NEXT IF 913 AND SENSECAMSWITCH
                                            715       913        103       716
                                    101  ---| |------| |------| |------(L)
                                            716       715
                                    102  ---| |------(U)---
```

BEST AVAILABLE COPY

```
PULSE: A PULSE AIR MOTOR DRIVE UNTIL CAM
     SWITCH TURNS OFF
   UNLATCH FORWARDCARRIERROTATION                 716       12
                                          103  ---| |------(U)---
   TIMER 914 TO .2                                716       914
                                          104  ---|/|-----(RST)--
                                                            0
                                                  716       914
                                          105  ---| |-----(RTO)--
                                                            .2
   GOTO NEXT IF 914                               716       914        717
                                          106  ---| |------| |------(L)---
                                                  717       716
                                          107  ---| |------(U)---
   GOTO LOOSEN IF NOT SENSECAMSWITCH              716       103        718
                                          108  ---| |------|/|------(L)---
                                                  718       716
                                          109  ---| |------(U)---

   :
   LATCH FORWARDCARRIERROTATION                   717       12
                                          110  ---| |------(L)---
   TIMER 915 TO .1                                717       915
                                          111  ---|/|-----(RST)--
                                                            0
                                                  717       915
                                          112  ---| |-----(RTO)--
                                                            .1
   GOTO NEXT IF NOT SENSECAMSWITCH                717       103        718
                                          113  ---| |------|/|------(L)
                                                  718       717
                                          114  ---| |------(U)---
   GOTO PULSE IF 915                              717       915        716
                                          115  ---| |------| |------(L)
                                                  716       717
                                          116  ---| |------(U)---

LOOSEN:
   UNLATCH FORWARDCARRIERROTATION                 718       12
                                          117  ---| |------(U)---
   UNLATCH SAFETYBEAMISENABLED                    718       860
                                          118  ---| |------(U)---
   LATCH RUNLIGHT                                 718       16
                                          119  ---| |------(L)---
   LATCH LEFTTRAVERSE                             718       113
                                          120  ---| |------(L)---
   RESET 928 TO 0                                 718       928
                                          121  ---| |-----(RST)--
                                                            0
   TIMER 916 TO .3                                718       916
                                          122  ---|/|-----(RST)--
                                                            0
                                                  718       916
                                          123  ---| |-----(RTO)--
                                                            .3
   GOTO NEXT IF 916 AND NOT SENSECLAMP            718       916        5          719
                                          124  ---| |------| |------|/|------(L)
                                                  719       718
                                          125  ---| |------(U)---
   GOTO WAITFORBEAM IF SENSELEFTSTOP              718       6          729
                                          126  ---| |------| |------(L)---
                                                  729       718
                                          127  ---| |------(U)---
```

```
:
GOTO NEXT IF SENSECLAMP AND NOT SENSE
  LOOSENBUTTON
                                                 719       5           3          72
                                           128 ---| |------| |------|/|------(L
                                                 730       719
                                           129 ---| |------(U)---

GOTO WAITFORBEAM IF SENSELEFTSTOP
                                                 719       6          729
                                           130 ---| |------| |------(L)---
                                                 729       719
                                           131 ---| |------(U)---

LOOSENCLAMP:
  RESET 919 TO 0
                                                 720       919
                                           132 ---| |-----(RST)--
                                                           0
  UNLATCH LEFTTRAVERSE
                                                 720       113
                                           133 ---| |------(U)---
  LATCH WRENCHCCW
                                                 720       13
                                           134 ---| |------(L)---
  LATCH WRENCHFORWARD
                                                 720       15
                                           135 ---| |------(L)---
  UNLATCH WRENCHCW
                                                 720       14
                                           136 ---| |------(U)---
  TIMER 917 TO 1.5
                                                 720       917
                                           137 ---|/|-----(RST)--
                                                           0
                                                 720       917
                                           138 ---| |-----(RTO)--
                                                           1.5
  GOTO NEXT IF 917
                                                 720       917        721
                                           139 ---| |------| |------(L)---
                                                 721       720
                                           140 ---| |------(U)---

  GOTO CONTINUELOOSENCLAMP IF SENSEWREN
    CHFORWARD
                                                 720       102        722
                                           141 ---| |------| |------(L)---
                                                 722       720
                                           142 ---| |------(U)---

  : A RELAX WRENCH FOR 1 SECOND AND TRY
    AGAIN
  UNLATCH WRENCHFORWARD
                                                 721       15
                                           143 ---| |------(U)---
  UNLATCH WRENCHCCW
                                                 721       13
                                           144 ---| |------(U)---
  COUNT 928 TO 5
                                                 721       928
                                           145 ---| |-----(CTU)--
                                                           5
  TIMER 918 TO 1.0
                                                 721       918
                                           146 ---|/|-----(RST)--
                                                           0
                                                 721       918
                                           147 ---| |-----(RTO)--
                                                           1.0
  GOTO LOOSENCLAMP IF 918
                                                 721       918        720
                                           148 ---| |------| |------(L)---
                                                 720       721
                                           149 ---| |------(U)---
  GOTO STOPMACHINE IF 928
                                                 721       928        730
                                           150 ---| |------| |------(L)---
                                                 730       721
                                           151 ---| |------(U)---

CONTINUELOOSENCLAMP:
  RESET 922 TO 0
                                                 722       922
                                           152 ---| |-----(RST)--
                                                           0
  RESET 920 TO 0
                                                 722       920
                                           153 ---| |-----(RST)--
```

BEST AVAILABLE COPY

```
                                                          0
COUNT 919 TO 4 IF SENSEDRIVER               722          104         919
                                      154 ---| |------| |-----(CTU)--
                                                                      4
GOTO STAMPINGSENSED IF SENSECLAMP           722          5           724
                                      155 ---| |------| |------(L)---
                                            724          722
                                      156 ---| |------(U)---

GOTO NUTBACKOFF IF NOT SENSEWRENCHFOR
  WARD                                      722          102         726
                                      157 ---| |------|/|------(L)---
                                            726          722
                                      158 ---| |------(U)---
GOTO DONELOOSENING IF 919                   722          919         728
                                      159 ---| |------| |------(L)---
                                            728          722
                                      160 ---| |------(U)---

: A LEAVE THIS STATE BLANK

STAMPINGSENSED: A LOOSEN UNTIL NOT SENSE
  D, THEN 10 TURNS
COUNT 920 TO 10 IF NOT SENSECLAMP           724          5           920
                                      161 ---| |------|/|-----(CTU)--
                                                                     10
GOTO DONELOOSENING IF 920                   724          920         728
                                      162 ---| |------| |------(L)---
                                            728          724
                                      163 ---| |------(U)---

GOTO NUTBACKOFF IF NOT SENSEWRENCHFOR
  WARD                                      724          102         726
                                      164 ---| |------|/|------(L)---
                                            726          724
                                      165 ---| |------(U)---
GOTO NEXT IF NOT SENSEDRIVER                724          104         725
                                      166 ---| |------|/|------(L)---
                                            725          724
                                      167 ---| |------(U)---

:
GOTO STAMPINGSENSED IF SENSEDRIVER          725          104         724
                                      168 ---| |------| |------(L)---
                                            724          725
                                      169 ---| |------(U)---

NUTBACKOFF: A TIGHTEN UNTIL WRENCH FORWA
  RD THEN 4 TURNS OR WRENCH STALLS
UNLATCH WRENCHCCW                           726          13
                                      170 ---| |------(U)---
LATCH WRENCHCW                              726          14
                                      171 ---| |------(L)---
TIMER 921 TO .4                             726          921
                                      172 ---|/|-----(RST)--
                                                          0
                                            726          921
                                      173 ---| |-----(RTO)--
                                                         .4
COUNT 922 TO 3 IF SENSEWRENCHFORWARD        726          102         922
                                      174 ---| |------| |-----(CTU)--
                                                                      3
GOTO LOOSENCLAMP IF 921                     726          921         730
                                      175 ---| |------| |------(L)---
                                            730          726
                                      176 ---| |------(U)---
GOTO DONELOOSENING IF 922                   726          922         728
                                      177 ---| |------| |------(L)---
                                            728          726
                                      178 ---| |------(U)---
```

```
GOTO NEXT IF NOT SENSEDRIVER                   726         104         727
                                         179  ---| |-------|/|-------(L)---
                                               727         726
                                         180  ---| |-------(U)---

:
TIMER 923 TO .4                                727         923
                                         181  ---|/|-------(RST)--
                                                            0
                                               727         923
                                         182  ---| |-------(RTO)--
                                                            .4
GOTO LOOSENCLAMP IF 923                        727         923         720
                                         183  ---| |-------| |-------(L)---
                                               720         727
                                         184  ---| |-------(U)---
GOTO NUTBACKOFF IF SENSEDRIVER                 727         104         736
                                         185  ---| |-------| |-------(L)---
                                               726         727
                                         186  ---| |-------(U)---

DONELOOSENING: * WAIT TILL WRENCH FALLS
   BACK THEN .3 SECONDS
  UNLATCH WRENCHCW                             728         14
                                         187  ---| |-------(U)---
  UNLATCH WRENCHCCW                            728         13
                                         188  ---| |-------(U)---
  UNLATCH WRENCHFORWARD                        728         15
                                         189  ---| |-------(U)---
  TIMER 924 TO .3 IF NOT SENSEWRENCHFOR
    WARD                                       728         924
                                         190  ---|/|-------(RST)--
                                                            0
                                               728         102         924
                                         191  ---| |-------|/|-------(RTO)--
                                                                        .3
  GOTO LOOSEN CLAMP IF 924                     728         924         718
                                         192  ---| |-------| |-------(L)---
                                               718         728
                                         193  ---| |-------(U)---

WAITFORBEAM:
  UNLATCH LEFTTRAVERSE                         729         113
                                         194  ---| |-------(U)---
  GOTO NEXT IF SENSESAFETYEYE                  729         4           730
                                         195  ---| |-------| |-------(L)---
                                               730         729
                                         196  ---| |-------(U)---

STOPMACHINE:
  RESETALL
                                               730         11
                                         197  ---| |-------(U)---
                                               730         12
                                         198  ---| |-------(U)---
                                               730         13
                                         199  ---| |-------(U)---
                                               730         14
                                         200  ---| |-------(U)---
                                               730         15
                                         201  ---| |-------(U)---
                                               730         16
                                         202  ---| |-------(U)---
                                               730         112
                                         203  ---| |-------(U)---
                                               730         113
                                         204  ---| |-------(U)---
                                               730         114
```

BEST AVAILABLE COPY

```
205  ---| |------(U)---
        730       701
206  ---| |------(U)---
        730       702
207  ---| |------(U)---
        730       703
208  ---| |------(U)---
        730       704
209  ---| |------(U)---
        730       705
210  ---| |------(U)---
        730       706
211  ---| |------(U)---
        730       707
212  ---| |------(U)---
        730       708
213  ---| |------(U)---
        730       709
214  ---| |------(U)---
        730       710
215  ---| |------(U)---
        730       711
216  ---| |------(U)---
        730       712
217  ---| |------(U)---
        730       713
218  ---| |------(U)---
        730       714
219  ---| |------(U)---
        730       715
220  ---| |------(U)---
        730       716
221  ---| |------(U)---
        730       717
222  ---| |------(U)---
        730       718
223  ---| |------(U)---
        730       719
224  ---| |------(U)---
        730       720
225  ---| |------(U)---
        730       721
226  ---| |------(U)---
        730       722
227  ---| |------(U)---
        730       724
228  ---| |------(U)---
        730       725
229  ---| |------(U)---
        730       726
230  ---| |------(U)---
        730       727
231  ---| |------(U)---
        730       728
232  ---| |------(U)---
        730       729
233  ---| |------(U)---
        730       860
234  ---| |------(U)---

HOLD STOPLIGHT                              730       111
                                     235  ---| |------(  )---
GOTO TIGHTEN IF SENSETIGHTENBUTTON          730       1              701
                                     236  ---| |------| |------(L)
                                            701       730
                                     237  ---| |------(U)---
```

BEST AVAILABLE COPY

```
GOTO LOOSEN IF SENSELOOSENBUTTON

GOTO FCR IF SENSEFORWARDCARRIERROTATE
  BUTTON

GOTO NEXT IF SENSEREVERSECARRIERROTAT
  EBUTTON

: A ROTATE CARRIER IN REVERSE
TIMER 925 TO .3

TIMER 926 TO 2.5

LATCH REVERSECARRIERROTATION IF NOT 9
  25 OR 926

UNLATCH REVERSECARRIERROTATION IF 925
   AND NOT 926

GOTO STOPMACHINE IF NOT SENSEREVERSEC
  ARRIERROTATEBUTTON

FCR: A ROTATE CARRIER FORWARD
  LATCH FORWARDCARRIERROTATION

GOTO STOPMACHINE IF NOT SENSEFORWARDC
  ARRIERROTATEBUTTON
```

```
           730          2             710
238    ---| |-------| |-------(L)-
           710         730
239    ---| |-------(U)---

           730         106            732
240    ---| |-------| |-------(L)---
           732         730
241    ---| |-------(U)---

           730         105            731
242    ---| |-------| |-------(L)---
           731         730
243    ---| |-------(U)---

           731         925
244    ---|/|-----(RST)--
                        0
           731         925
245    ---| |-----(RTO)--
                        .3
           731         926
246    ---|/|-----(RST)--
                        0
           731         926
247    ---| |-----(RTO)--
                        2.5

           731         925           R           92(
248    ---| |-------|/|-------OR ------|

           731         925          926          11
249    ---| |-------| |-------|/|-------(U

           731         105          730
250    ---| |-------|/|-------(L)---
           730         731
251    ---| |-------(U)---

           732         12
252    ---| |-------(L)---

           732         106          730
253    ---| |-------|/|-------(L)---
           730         732
254    ---| |-------(U)---
```

BEST AVAILABLE COPY

APPENDIX B

```
DEFINE SENSELOWERLEFTSTOP=2
DEFINE SENSELOWERRIGHTSTOP=3
DEFINE SENSELOWERWRENCHFORWARD=4
DEFINE SENSELOWERDRIVER=5

DEFINE SENSEUPPERCLAMP=101
DEFINE SENSEUPPERLEFTSTOP=102
DEFINE SENSEUPPERRIGHTSTOP=103
DEFINE SENSEUPPERWRENCHFORWARD=104
DEFINE SENSEUPPERDRIVER=105

DEFINE SENSELOWERLEFTBUTTON=6
DEFINE SENSELOWERRIGHTBUTTON=7

DEFINE SENSEUPPERLEFTBUTTON=106
DEFINE SENSEUPPERRIGHTBUTTON=107

DEFINE SENSESTOPBUTTON=8
DEFINE SENSECYCLEBUTTON=9

DEFINE SENSESAFETYMAT=10
DEFINE SENSECAMSWITCH=108

DEFINE SENSEREVERSECARRIERROTATEBUTTON=1
      09
DEFINE SENSEFORWARDCARRIERROTATEBUTTON=1
      10

DEFINE REVERSECARRIERROTATION=11
DEFINE FORWARDCARRIERROTATION=12

DEFINE UPPERWRENCHCCW=13
DEFINE UPPERWRENCHCW=111
DEFINE UPPERWRENCHFORWARD=15

DEFINE UPPERLEFTTRAVERSE=116
DEFINE UPPERRIGHTTRAVERSE=14

DEFINE LOWERWRENCHCCW=16

DEFINE LOWERWRENCHCW=113
DEFINE LOWERWRENCHFORWARD=112
DEFINE LOWERLEFTTRAVERSE=115
DEFINE LOWERRIGHTTRAVERSE=114

DEFINE SAFETYMATWASUSED=849
DEFINE CARRIERROTATING=850
DEFINE LOWERDRIVERSENSED=851
DEFINE UPPERDRIVERSENSED=852
DEFINE CARRIAGESHOME=853
DEFINE UPPERGOINGLEFT=854
DEFINE LOWERGOINGLEFT=855
DEFINE UPPERTIGHTENLEFT=856
DEFINE LOWERTIGHTENLEFT=857
DEFINE UPPERTIGHTENMODE=858
DEFINE LOWERTIGHTENMODE=859
DEFINE SAFETYMATISENABLED=860
DEFINE POWERRESTORED=868
DEFINE LOWERPASSCLAMPTIMER=901
DEFINE LOWERWRENCHUPTIMER=903
DEFINE LOWERRELAXTIMER=903
DEFINE LOWERDRIVERCOUNTER=904
DEFINE LOWERSTALLTIMER=905
DEFINE LOWERWRENCHBACKTIMER=907
DEFINE LOWERTURNSCOUNTER=908
```

BEST AVAILABLE COPY

```
DEFINE LOWERPROTRUSIONTIMER=909
DEFINE LOWERPASSCLAMPTIMER2=910
DEFINE CARRIERREVERSETIMER=911
DEFINE CARRIERWAITTIMER=912
DEFINE CARRIERWAITTIMER2=913
DEFINE CARRIERPULSETIMER=914
DEFINE CARRIERPULSETIMER2=915
DEFINE UPPERPASSCLAMPTIMER=916
DEFINE UPPERWRENCHUPTIMER=917
DEFINE UPPERRELAXTIMER=918
DEFINE UPPERTURNSCOUNTER=919
DEFINE UPPERTURNSCOUNTER2=920
DEFINE UPPERBACKOFFTIMER=921
DEFINE UPPERTURNSCOUNTER3=922
DEFINE UPPERBACKOFFTIMER2=923
DEFINE UPPERRELAXTIMER2=924
DEFINE BUTTONCARRIERTIMER1=925
DEFINE BUTTONCARRIERTIMER2=926
DEFINE CARRIERSTOPTIMER=931

DEFINE UPPERSTALLTIMER=906
DEFINE UPPERWRENCHBACKTIMER=927
DEFINE LOWERTURNSCOUNTER3=928
DEFINE LOWERTURNSCOUNTER2=929
DEFINE LOWERRELAXTIMER3=930
DEFINE ROTATINGTIMER=932

HOLD 864 WHENEVER

LATCH SAFETYMATWASUSED WHENEVER SENSESAF
     ETYMAT

HOLD CARRIAGESHOME WHENEVER ( SENSEUPPER
     LEFTSTOP OR SENSEUPPERRIGHTSTOP ) A
     ND ( SENSELOWERLEFTSTOP OR SENSELOW

853

GOTO STOPMACHINE WHENEVER NOT SENSESTOPB
     UTTON OR POWERRESTORED OR ( SAFETYM
     ATISENABLED AND 10 )

L737

GOTO ROTATECARRIER WHENEVER LOWERSTOP AN
     D UPPERSTOP AND 849 AND 9 AND ( CAR
     RIAGESHOME OR 850 )
I735 I736 I849 I9 ( I853 OR I850 ) L716

GOTO FCR WHENEVER LOWERSTOP AND UPPERSTO
     P AND SENSEFORWARDCARRIERROTATEBUTT
     ON AND ( CARRIAGESHOME OR 850 )
I735 I736 I110 ( I853 OR I85 L739
GOTO RCR WHENEVER LOWERSTOP AND UPPERSTO
     P AND SENSEREVERSECARRIERROTATEBUTT
     ON AND ( CARRIAGESHOME OR 850 )
I735 I736 I109 ( I853 OR I85 L738

GOTO LOWERSTOP WHENEVER SENSELOWERLEFTST
     OP AND LOWERLEFTTRAVERSE

GOTO LOWERSTOP WHENEVER SENSELOWERRIGHTS
     TOP AND LOWERRIGHTTRAVERSE

GOTO LOWERSTOP WHENEVER SENSELOWERLEFTBU
     TTON AND SENSELOWERRIGHTBUTTON
```

```
         864
1     ---( )---

         10        849
2     ---| |-------(L)---

                   102       R
3     ---(    -------| |------OR -----

         8         R         860
4     ---|/|-------OR -------| |-----

         2         115       735
5     ---| |-------| |-------(L)---

         3         114       735
6     ---| |-------| |-------(L)---

         6         7         735
7     ---| |-------| |-------(L)---
```

GOTO UPPERSTOP WHENEVER SENSEUPPERLEFTSTOP AND UPPERLEFTTRAVERSE

```
      102        116        736
8   ---| |------| |------(L)---
```

GOTO UPPERSTOP WHENEVER SENSEUPPERRIGHTSTOP AND UPPERRIGHTTRAVERSE

```
      103        14         736
9   ---| |------| |------(L)---
```

GOTO UPPERSTOP WHENEVER SENSEUPPERLEFTBUTTON AND SENSEUPPERRIGHTBUTTON

```
      106        107        736
10  ---| |------| |------(L)---
```

LATCH LOWERTIGHTENLEFT WHENEVER SENSELOWERRIGHTSTOP

```
      3          857
11  ---| |------(L)---
```

UNLATCH LOWERTIGHTENLEFT WHENEVER SENSELOWERLEFTSTOP

```
      2          857
12  ---| |------(U)---
```

UNLATCH UPPERTIGHTENLEFT WHENEVER SENSEUPPERRIGHTSTOP

```
      103        856
13  ---| |------(U)---
```

LATCH UPPERTIGHTENLEFT WHENEVER SENSEUPPERLEFTSTOP

```
      102        856
14  ---| |------(L)---
```

UNLATCH LOWERTIGHTENMODE WHENEVER

```
      859
15  ---(U)---
```

LATCH LOWERTIGHTENMODE WHENEVER LOWERTIGHTENLEFT AND LOWERGOINGLEFT

```
      857        855        859
16  ---| |------| |------(L)---
```

LATCH LOWERTIGHTENMODE WHENEVER NOT LOWERTIGHTENLEFT AND NOT LOWERGOINGLEFT

```
      857        855        859
17  ---|/|------|/|------(L)---
```

UNLATCH UPPERTIGHTENMODE WHENEVER

```
      858
18  ---(U)---
```

LATCH UPPERTIGHTENMODE WHENEVER UPPERTIGHTENLEFT AND UPPERGOINGLEFT

```
      856        854        858
19  ---| |------| |------(L)---
```

LATCH UPPERTIGHTENMODE WHENEVER NOT UPPERTIGHTENLEFT AND NOT UPPERGOINGLEFT

```
      856        854        858
20  ---|/|------|/|------(L)---
```

RESET ROTATINGTIMER WHENEVER NOT CARRIER

LATCH LOWERWRE. CW IF LOWERTIGHTENMODE

```
      703        859        113
38  ---| |------| |------(L)---
```

LATCH LOWERWRENCHCCW IF NOT LOWERTIGHTENMODE

```
      703        859        16
39  ---| |------|/|------(L)---
```

LATCH LOWERWRENCHFORWARD

```
      703        112
40  ---| |------(L)---
```

RESET LOWERDRIVERCOUNTER TO 0

```
      703        904
41  ---| |-----(RST)--
                 0
```

RESET LOWERTURNSCOUNTER TO 0

```
      703        908
42  ---| |-----(RST)--
                 0
```

TIMER LOWERWRENCHUPTIMER TO 1.5

```
      703        902
43  ---|/|-----(RST)--
                 0
      703        902
44  ---| |-----(RTO)--
                 1.5
```

GOTO NEXT IF LOWERWRENCHUPTIMER

```
      703        902        704
45  ---| |------| |------(L)---
      704        703
46  ---| |------(U)---
```

BEST AVAILABLE COPY

```
GOTO LOWERTIGHTENCLAMP IF SENSELOWERW
  RENCHFORWARD AND LOWERTIGHTENMODE
                                              703       4          859       7
                                        47  ---| |------| |--------| |------(
                                              705       703
                                        48  ---| |------(U)---

GOTO LOWERLOOSENCLAMP IF SENSELOWERWR
  ENCHFORWARD AND NOT LOWERTIGHTENMOD
  E
                                              703       4          859       7
                                        49  ---| |------| |--------|/|------(
                                              712       703
                                        50  ---| |------(U)---

LOWERRELAX: A RELAX WRENCH, WAIT 1 SECON
   D AND TRY AGAIN
 UNLATCH LOWERWRENCHFORWARD
                                              704       112
                                        51  ---| |------(U)---
 UNLATCH LOWERWRENCHCW
                                              704       113
                                        52  ---| |------(U)---
 UNLATCH LOWERWRENCHCCW
                                              704       16
                                        53  ---| |------(U)---
 TIMER LOWERRELAXTIMER TO 1.0
                                              704       903
                                        54  ---|/|-----(RST)--
                                                        0
                                              704       903
                                        55  ---| |-----(RTO)--
                                                        1.0

 GOTO LOWERGETONCLAMP IF LOWERRELAXTIM
   ER
                                              704       903        703
                                        56  ---| |------| |-------(L)
                                              703       704
                                        57  ---| |------(U)---

LOWERTIGHTENCLAMP: A FLIP FLOP BETWEEN S
   TATES UNTIL DRIVER STALLS
 TIMER LOWERSTALLTIMER TO .5
                                              705       905
                                        58  ---|/|-----(RST)--
                                                        0
                                              705       905
                                        59  ---| |-----(RTO)--
                                                        .5

 GOTO NEXT IF SENSELOWERDRIVER AND NOT
   LOWERDRIVERSENSED
                                              705       5          851       706
                                        60  ---| |------| |--------|/|------(L)
                                              706       705
                                        61  ---| |------(U)---

 GOTO NEXT IF NOT SENSELOWERDRIVER AND
   LOWERDRIVERSENSED
                                              705       5          851       706
                                        62  ---| |------|/|--------| |------(L)
                                              706       705
                                        63  ---| |------(U)---

 GOTO LOWERSTALLED IF LOWERSTALLTIMER
                                              705       905        707
                                        64  ---| |------| |-------(L)---
                                              707       705
                                        65  ---| |------(U)---

 GOTO LOWERSCREWPROTRUSION IF NOT SENS
   ELOWERWRENCHFORWARD AND LOWERDRIVER
   COUNTER
                                              705       4          904       70
                                        66  ---| |------|/|--------| |------(L
                                              708       705
                                        67  ---| |------(U)---

LOWERTIGHTEN2:
 RESET LOWERSTALLTIMER TO 0
                                              706       905
                                        68  ---| |-----(RST)--
```

BEST AVAILABLE COPY

```
   COUNT LOWERDRIVERCOUNTER TO 4                            706      904
                                                 69  ---| |------(CTU)--
                                                                  4
   UNLATCH LOWERDRIVERSENSED                            706      851
                                                 70  ---| |-------(U)---

   LATCH LOWERDRIVERSENSED IF SENSELOWER
     DRIVER                                             706      5        851
                                                 71  ---| |-------| |-------(L)---
   GOTO LOWERTIGHTENCLAMP                               706      705
                                                 72  ---| |------(L)---
                                                        705      706
                                                 73  ---| |------(U)---

LOWERSTALLED:
   UNLATCH LOWERWRENCHCW                                707      113
                                                 74  ---| |-------(U)---
   UNLATCH LOWERWRENCHFORWARD                           707      112
                                                 75  ---| |------(U)---
   TIMER LOWERWRENCHBACKTIMER TO .3 IF N
     OT SENSELOWERWRENCHFORWARD                         707      907
                                                 76  ---|/|-----(RST)--
                                                                  0
                                                        707      4        907
                                                 77  ---| |-------|/|-------(RTO)--
                                                                           .3

   GOTO LOWERFINDCLAMP IF LOWERWRENCHBAC
     KTIMER                                             707      907      701
                                                 78  ---| |-------| |-------(L)---
                                                        701      707
                                                 79  ---| |------(U)---

LOWERSCREWPROTRUSION:
   UNLATCH LOWERWRENCHCW                                708      113
                                                 80  ---| |------(U)---
   LATCH LOWERWRENCHCCW                                 708      16
                                                 81  ---| |-------(L)---
   GOTO NEXT IF SENSELOWERWRENCHFORWARD                 708      4        709
                                                 82  ---| |-------| |-------(L)---
                                                        709      708
                                                 83  ---| |------(U)---

LOWERPROTRUSION1:
   COUNT LOWERTURNSCOUNTER TO 22 IF SENS
     ELOWERDRIVER                                       709      5        908
                                                 84  ---| |-------| |------(CTU)--
                                                                           22
   GOTO NEXT IF LOWERTURNSCOUNTER                       709      908      710
                                                 85  ---| |-------| |-------(L)---
                                                        710      709
                                                 86  ---| |------(U)---

   GOTO LOWERGETONCLAMP IF NOT SENSELOWE
     RWRENCHFORWARD                                     709      4        703
                                                 87  ---| |------|/|-------(L)---
                                                        703      709
                                                 88  ---| |------(U)---

LOWERPROTRUSION2:
   UNLATCH LOWERWRENCHFORWARD                           710      112
                                                 89  ---| |-------(U)---
   UNLATCH LOWERWRENCHCCW                               710      16
                                                 90  ---| |-------(U)---
   TIMER LOWERPROTRUSIONTIMER TO .3 IF N
     OT SENSELOWERWRENCHFORWARD                         710      909
                                                 91  ---|/|-----(RST)--
                                                                  0
                                                        710      4        909
                                                 92  ---| |------|/|------(RTO)--
```

```
GOTO NEXT IF LOWERPROTRUSIONTIMER
                                                    .3
                                710       909       711
                          93 ---| |-------| |-------(L)---
                                711       710
                          94 ---| |-------(U)---

LOWERPROTRUSIONS: A GET PASSED CLAMP
  LATCH LOWERLEFTTRAVERSE IF NOT LOWERRIGHTENLEFT
                                711       857       115
                          95 ---| |-------|/|-------(L)---

  LATCH LOWERRIGHTTRAVERSE IF LOWERTIGHTENLEFT
                                711       857       114
                          96 ---| |-------| |-------(L)---

  TIMER LOWERPASSCLAMPTIMER2 TO .5
                                711       910
                          97 ---|/|-------(RST)--
                                          0
                                711       910
                          98 ---| |-------(RTO)--
                                          .5

  GOTO LOWERSTOP IF LOWERPASSCLAMPTIMER2 AND SENSELOWERCLAMP
                                711       910       1
                          99 ---| |-------| |-------| |-----
                                735       711
                         100 ---| |-------(U)---

  GOTO LOWERSTOP IF SENSELOWERLEFTSTOP OR SENSELOWERRIGHTSTOP
                                711       2         R         3
                         101 ---| |-------| |-------OR -------|
                                735       711
                         102 ---| |-------(U)---

LOWERLOOSENCLAMP:
  RESET LOWERTURNSCOUNTER2 TO 0
                                712       929
                         103 ---| |-------(RST)--
                                          0

  COUNT LOWERTURNSCOUNTER3 TO 4 IF SENSELOWERDRIVER
                                712       5         928
                         104 ---| |-------| |-------(CTU)--
                                                    4

  GOTO LOWERSTAMPINGSENSED IF SENSELOWERCLAMP
                                712       1         713
                         105 ---| |-------| |-------(L)---
                                713       712
                         106 ---| |-------(U)---

  GOTO LOWERDONELOOSENING IF LOWERTURNSCOUNTER3
                                712       928       715
                         107 ---| |-------| |-------(L)---
                                715       712
                         108 ---| |-------(U)---

LOWERSTAMPINGSENSED: A LOOSEN UNTIL NOT SENSED. THEN 10 TURNS
  COUNT LOWERTURNSCOUNTER2 TO 10 IF NOT SENSELOWERCLAMP
                                713       1         929
                         109 ---| |-------|/|-------(CTU)--
                                                    10

  GOTO LOWERDONELOOSENING IF LOWERTURNSCOUNTER2
                                713       929       715
                         110 ---| |-------| |-------(L)---
                                715       713
                         111 ---| |-------(U)---

  GOTO NEXT IF NOT SENSELOWERDRIVER
                                713       5         714
                         112 ---| |-------|/|-------(L)---
                                714       713
                         113 ---| |-------(U)---
```

BEST AVAILABLE COPY

```
LOWERSTAMPING2:
   GOTO LOWERSTAMPINGSENSED IF SENSELOWE        714       5          713
     RDRIVER                              114  ---| |-------| |-------(L)---
                                                713       714
                                          115  ---| |------(U)---

LOWERDONELOOSENING: A WAIT TILL WRENCH E
     ALLS BACK THEN .3 SECONDS
   UNLATCH LOWERWRENCHCW                        715       113
                                          116  ---| |------(U)---
   UNLATCH LOWERWRENCHCCW                       715       16
                                          117  ---| |------(U)---
   UNLATCH LOWERWRENCHFORWARD                   715       112
                                          118  ---| |------(U)---
   TIMER LOWERRELAXTIMER3 TO .3 IF NOT S
     ENSELOWERWRENCHFORWARD                     715       930
                                          119  ---|/|-----(RST)--
                                                           0
                                                715       4          930
                                          120  ---| |-------|/|-----(RTO)--
                                                                     .3
   GOTO LOWERFINDCLAMP IF LOWERRELAXTIME
     R3                                         715       930        701
                                          121  ---| |------| |-------(L)---
                                                701       715
                                          122  ---| |------(U)---

ROTATECARRIER:
   UNLATCH SAFETYMATWASUSED                     716       849
                                          123  ---| |------(U)---
   UNLATCH LOWERSTOP                            716       735
                                          124  ---| |------(U)---
   UNLATCH UPPERSTOP                            716       736
                                          125  ---| |------(U)---
   LATCH CARRIERROTATING                        716       850
                                          126  ---| |------(L)---
   LATCH SAFETYMATISENABLED                     716       860
                                          127  ---| |------(L)---
   LATCH REVERSECARRIERROTATION                 716       11
                                          128  ---| |------(L)---
   TIMER CARRIERREVERSETIMER TO .3              716       911
                                          129  ---|/|-----(RST)--
                                                           0
                                                716       911
                                          130  ---| |-----(RTO)--
                                                           .3
   GOTO NEXT IF CARRIERREVERSETIMER             716       911        717
                                          131  ---| |------| |-------(L)---
                                                717       716
                                          132  ---| |------(U)---

ROTATEWAIT: A WAIT FOR FRONT REST TO COM
     E OUT
   UNLATCH REVERSECARRIERROTATION               717       11
                                          133  ---| |------(U)---
   TIMER CARRIERWAITTIMER TO 2.2                717       912
                                          134  ---|/|-----(RST)--
                                                           0
                                                717       912
                                          135  ---| |-----(RTO)--
                                                           2.2
   TIMER CARRIERWAITTIMER2 TO 3.2               717       913
                                          136  ---|/|-----(RST)--
                                                           0
                                                717       913
                                          137  ---| |-----(RTO)--
                                                           3.2
```

BEST AVAILABLE COPY

```
LATCH FORWARDCARRIERROTATION IF CARRI
  ERWAITTIMER
                 717        912        12
138        ---| |-------| |-------(L)---

GOTO NEXT IF CARRIERWAITTIMER2 AND SE
  NSECAMSWITCH
                 717        913        108
139        ---| |-------| |------| |---
                 718        717
140        ---| |-------(U)---

ROTATEAGAIN: A [illegible] AIR MOTOR DRIVE TO L
  ET FRONT RESTS COME IN
  UNLATCH FORWARDCARRIERROTATION
                 718        12
141        ---| |-------(U)---
  TIMER CARRIERSTOPTIMER TO 1.0
                 718        931
142        ---|/|-----(RST)--
                            0
                 718        931
143        ---| |-----(RTO)--
                            1.0
  GOTO NEXT IF CARRIERSTOPTIMER
                 718        931        719
144        ---| |-------| |-------(L)---
                 719        718
145        ---| |-------(U)---

PULSE:
  LATCH FORWARDCARRIERROTATION
                 719        12
146        ---| |-------(L)---
  TIMER CARRIERPULSETIMER TO .1
                 719        914
147        ---|/|-----(RST)--
                            0
                 719        914
148        ---| |-----(RTO)--
                            .1
  GOTO ENDOFROTATION IF NOT SENSECAMSWI
    TCH
                 719        108        721
149        ---| |-------|/|-------(L)---
                 721        719
150        ---| |-------(U)---
  GOTO NEXT IF CARRIERPULSETIMER
                 719        914        720
151        ---| |-------| |-------(L)---
                 720        719
152        ---| |-------(U)---

PULSE2:
  UNLATCH FORWARDCARRIERROTATION
                 720        12
153        ---| |-------(U)---
  TIMER CARRIERPULSETIMER2 TO .3
                 720        915
154        ---|/|-----(RST)--
                            0
                 720        915
155        ---| |-----(RTO)--
                            .3
  GOTO ENDOFROTATION IF NOT SENSECAMSWI
    TCH
                 720        108        721
156        ---| |-------|/|-------(L)---
                 721        720
157        ---| |-------(U)---
  GOTO PULSE IF CARRIERPULSETIMER2
                 720        915        719
158        ---| |-------| |-------([illegible])---
                 719        720
159        ---| |-------(U)---

ENDOFROTATION:
  UNLATCH FORWARDCARRIERROTATION
                 721        12
160        ---| |-------(U)---
  UNLATCH LOWERGOINGLEFT
                 721        855
161        ---| |-------(U)---
  UNLATCH SAFETYMATISENABLED
                 721        860
162        ---| |-------(U)---
```

BEST AVAILABLE COPY

```
LATCH LOWERGOINGLEFT IF SENSELOWERRIG
  HTSTOP
                                          721       3          855
                                     163  ---| |------| |-------(L)---
UNLATCH UPPERGOINGLEFT
                                          721       854
                                     164  ---| |------(U)---
LATCH UPPERGOINGLEFT IF SENSEUPPERRIG
  HTSTOP
                                          721       103        854
                                     165  ---| |------| |-------(L)---
LATCH LOWERFINDCLAMP IF CARRIAGESHOME
                                          721       853        701
                                     166  ---| |------| |-------(L)---
GOTO UPPERFINDCLAMP IF CARRIAGESHOME
                                          721       853        722
                                     167  ---| |------| |-------(L)---
                                          722       721
                                     168  ---| |------(U)---

UPPERFINDCLAMP:
  LATCH UPPERLEFTTRAVERSE IF UPPERGOING
    LEFT
                                          722       854        116
                                     169  ---| |------| |-------(L)---
  LATCH UPPERRIGHTTRAVERSE IF NOT UPPER
    GOINGLEFT
                                          722       854        14
                                     170  ---| |------|/|-------(L)---
  TIMER UPPERPASSCLAMPTIMER TO .3
                                          722       916
                                     171  ---|/|-----(RST)--
                                                    0
                                          722       916
                                     172  ---| |-----(RTO)--
                                                    .3
  GOTO NEXT IF UPPERPASSCLAMPTIMER AND
    NOT SENSEUPPERCLAMP
                                          722       916        101
                                     173  ---| |------| |-------|/|-------
                                          723       722
                                     174  ---| |------(U)---

UPPERFIND2:
  GOTO NEXT IF SENSEUPPERCLAMP AND NOT
    SENSEUPPERLEFTBUTTON AND NOT SENSEU
    PPERRIGHTBUTTON
                                          723       101        106
                                     175  ---| |------| |-------|/|-------
                                          724       723
                                     176  ---| |------(U)---

UPPERGETONCLAMP:
  RESET UPPERTURNSCOUNTER TO 0
                                          724       919
                                     177  ---| |-----(RST)--
                                                    0
  UNLATCH UPPERLEFTTRAVERSE
                                          724       116
                                     178  ---| |------(U)---
  UNLATCH UPPERRIGHTTRAVERSE
                                          724       14
                                     179  ---| |------(U)---
  LATCH UPPERWRENCHCCW IF NOT UPPERTIGH
    TENMODE
                                          724       858        13
                                     180  ---| |------|/|-------(L)---
  LATCH UPPERWRENCHCW IF UPPERTIGHTENMO
    DE
                                          724       858        111
                                     181  ---| |------| |-------(L)---
  LATCH UPPERWRENCHFORWARD
                                          724       15
                                     182  ---| |------(L)---
  TIMER UPPERWRENCHUPTIMER TO 1.5
                                          724       917
                                     183  ---|/|-----(RST)--
                                                    0
                                          724       917
                                     184  ---| |-----(RTO)--
                                                    1.5
  GOTO NEXT IF UPPERWRENCHUPTIMER
                                          724       917        725
                                     185  ---| |------| |-------(L)---
                                          725       724
                                     186  ---| |------(U)---
```

```
GOTO UPPERLOOSENCLAMP IF SENSEUPPERWR
  ENCHFORWARD AND NOT UPPERTIGHTENMOD
  E
                                        724       104       850
                                  187 ---| |------| |------|/|------
                                        726       724
                                  188 ---| |------(U)---

GOTO UPPERTIGHTENCLAMP IF SENSEUPPERW
  RENCHFORWARD AND UPPERTIGHTENMODE
                                        724       104       850
                                  189 ---| |------| |------| |------
                                        732       724
                                  190 ---| |------(U)---

UPPERRELAX: A RELAX WRENCH FOR 1 SECOND
    AND TRY AGAIN
  UNLATCH UPPERWRENCHFORWARD
                                        725       15
                                  191 ---| |------(U)---
  UNLATCH UPPERWRENCHCCW
                                        725       13
                                  192 ---| |------(U)---
  UNLATCH UPPERWRENCHCW
                                        725       111
                                  193 ---| |------(U)---
  TIMER UPPERRELAXTIMER TO 1.0
                                        725       918
                                  194 ---|/|-----(RST)--
                                                  0
                                        725       918
                                  195 ---| |-----(RTO)--
                                                  1.0

  GOTO UPPERRETURNCLAMP IF UPPERRELAXTIM
    ER
                                        725       918       724
                                  196 ---| |------| |------(L)---
                                        724       725
                                  197 ---| |------(U)---

UPPERLOOSENCLAMP:
  RESET UPPERTURNSCOUNTER3 TO 0
                                        726       922
                                  198 ---| |-----(RST)--
                                                  0
  RESET UPPERTURNSCOUNTER2 TO 0
                                        726       920
                                  199 ---| |-----(RST)--
                                                  0
  COUNT UPPERTURNSCOUNTER TO 4 IF SENSE
    UPPERDRIVER
                                        726       105       919
                                  200 ---| |------| |-----(CTU)--
                                                            4
  GOTO UPPERSTAMPINGSENSED IF SENSEUPPE
    RCLAMP
                                        726       101       727
                                  201 ---| |------| |------(L)---
                                        727       726
                                  202 ---| |------(U)---
  GOTO UPPERNUTBACKOFF IF NOT SENSEUPPE
    RWRENCHFORWARD
                                        726       104       729
                                  203 ---| |------|/|------(L)---
                                        729       726
                                  204 ---| |------(U)---
  GOTO UPPERDONELOOSENING IF UPPERTURNS
    COUNTER
                                        726       919       731
                                  205 ---| |------| |------(L)---
                                        731       726
                                  206 ---| |------(U)---

UPPERSTAMPINGSENSED: A LOOSEN UNTIL NOT
    SENSED, THEN 10 TURNS
  COUNT UPPERTURNSCOUNTER2 TO 10 IF NOT
    SENSEUPPERCLAMP
                                        727       101       920
                                  207 ---| |------|/|-----(CTU)--
                                                            10
```

BEST AVAILABLE COPY

```
GOTO UPPERDONELOOSENING IF UPPERTURNS
  COUNTER2
                                              727       920        731
                                        208 ---| |------| |------(L)---
                                              731       727
                                        209 ---| |------(U)---

GOTO UPPERNUTBACKOFF IF NOT SENSEUPPE
  RWRENCHFORWARD
                                              727       104        729
                                        210 ---| |------|/|------(L)---
                                              729       727
                                        211 ---| |------(U)---

GOTO NEXT IF NOT SENSEUPPERDRIVER
                                              727       105        728
                                        212 ---| |------|/|------(L)---
                                              728       727
                                        213 ---| |------(U)---

UPPERSTAMPING2:
  GOTO UPPERSTAMPINGSENSED IF SENSEUPPE
    RDRIVER
                                              728       105        727
                                        214 ---| |------| |------(L)---
                                              727       728
                                        215 ---| |------(U)---

UPPERNUTBACKOFF: A TIGHTEN UNTIL WRENCH
    FORWARD THEN 4 TURNS OR WRENCH STAL
    LS
  UNLATCH UPPERWRENCHCCW
                                              729       13
                                        216 ---| |------(U)---
  LATCH UPPERWRENCHCW
                                              729       111
                                        217 ---| |------(L)---
  TIMER UPPERBACKOFFTIMER TO .4
                                              729       921
                                        218 ---|/|-----(RST)--
                                                         0
                                              729       921
                                        219 ---| |-----(RTO)--
                                                         .4

  COUNT UPPERTURNSCOUNTER3 TO 3 IF SENS
    EUPPERWRENCHFORWARD
                                              729       104        922
                                        220 ---| |------| |-----(CTU)--
                                                                    3

  GOTO UPPERGETONCLAMP IF UPPERBACKOFFT
    IMER
                                              729       921        724
                                        221 ---| |------| |------(L)---
                                              724       729
                                        222 ---| |------(U)---

  GOTO UPPERDONELOOSENING IF UPPERTURNS
    COUNTER3
                                              729       922        731
                                        223 ---| |------| |------(L)---
                                              731       729
                                        224 ---| |------(U)---

  GOTO NEXT IF NOT SENSEUPPERDRIVER
                                              729       105        730
                                        225 ---| |------|/|------(L)---
                                              730       729
                                        226 ---| |------(U)---

UPPERBACKOFF2:
  TIMER UPPERBACKOFFTIMER2 TO .4
                                              730       923
                                        227 ---|/|-----(RST)--
                                                         0
                                              730       923
                                        228 ---| |-----(RTO)--
                                                         .4

  GOTO UPPERGETONCLAMP IF UPPERBACKOFFT
    IMER2
                                              730       923        724
                                        229 ---| |------| |------(L)---
                                              724       730
                                        230 ---| |------(U)---
```

BEST AVAILABLE COPY

GOTO UPPERNUTBACKOFF IF SENSEUPPERDRIVER

```
          730        105        729
231   ---| |------| |------(L)---
          729        730
232   ---| |------(U)---
```

UPPERDONELOOSENING: A WAIT TILL WRENCH FALLS BACK THEN .3 SECONDS
UNLATCH UPPERWRENCHCW

```
          731        111
233   ---| |------(U)---
```

UNLATCH UPPERWRENCHCCW

```
          731        13
234   ---| |------(U)---
```

UNLATCH UPPERWRENCHFORWARD

```
          731        15
235   ---| |------(U)---
```

TIMER UPPERRELAXTIMER2 TO .3 IF NOT SENSEUPPERWRENCHFORWARD

```
          731        924
236   ---|/|-----(RST)--
                     0
          731        104        924
237   ---| |------|/|-----(RTO)--
                                .3
```

GOTO UPPERFINDCLAMP IF UPPERRELAXTIMER2

```
          731        924        722
238   ---| |------| |------(L)---
          722        731
239   ---| |------(U)---
```

UPPERTIGHTENCLAMP: A FLIP FLOP BETWEEN STATES UNTIL DRIVER STALLS
TIMER UPPERSTALLTIMER TO .5

```
          732        906
240   ---|/|-----(RST)--
                     0
          732        906
241   ---| |-----(RTO)--
                     .5
```

GOTO NEXT IF SENSEUPPERDRIVER AND NOT UPPERDRIVERSENSED

```
          732        105        852
242   ---| |------| |----- |/| ---
          733        732
243   ---| |------(U)---
```

GOTO NEXT IF NOT SENSEUPPERDRIVER AND UPPERDRIVERSENSED

```
          732        105        852        73
244   ---| |------|/|------| |------(L
          733        732
245   ---| |------(U)---
```

GOTO UPPERSTALLED IF UPPERSTALLTIMER

```
          732        906        734
246   ---| |------| |------(L)---
          734        732
247   ---| |------(U)---
```

UPPERDRIVERCOUNTER:
RESET UPPERSTALLTIMER TO 0

```
          733        906
248   ---| |-----(RST)--
                     0
```

UNLATCH UPPERDRIVERSENSED

```
          733        852
249   ---| |------(U)---
```

LATCH UPPERDRIVERSENSED IF SENSEUPPERDRIVER

```
          733        105        852
250   ---| |------| |------(L)---
```

GOTO UPPERTIGHTENCLAMP

```
          733        732
251   ---| |------(L)---
          732        733
252   ---| |------(U)---
```

BEST AVAILABLE COPY

```
UPPERSTALLED:
   UNLATCH UPPERWRENCHCW                              734        111
                                                253 ---| |------(U)---
   UNLATCH UPPERWRENCHFORWARD                         734        15
                                                254 ---| |------(U)---
   TIMER UPPERWRENCHBACKTIMER TO .3 IF N
     OT SENSEUPPERWRENCHFORWARD                       734        927
                                                255 ---|/|-----(RST)--
                                                                  0
                                                      734        104          927
                                                256 ---| |------|/|-----(RTO)--
                                                                             .3
   GOTO UPPEREINDCLAMP IF UPPERWRENCHBAC
     KTIMER                                           734        927          722
                                                257 ---| |-----| |------(L)---
                                                      722        734
                                                258 ---| |------(U)---

LOWERSTOP:
   UNLATCH LOWERLEFTTRAVERSE                          735        115
                                                259 ---| |------(U)---
   UNLATCH LOWERRIGHTTRAVERSE                         735        114
                                                260 ---| |------(U)---
   UNLATCH LOWERWRENCHCCW                             735        16
                                                261 ---| |------(U)---
   UNLATCH LOWERWRENCHCW                              735        113
                                                262 ---| |------(U)---
   UNLATCH LOWERWRENCHFORWARD                         735        112
                                                263 ---| |------(U)---
   UNLATCH LOWEREINDCLAMP                             735        701
                                                264 ---| |------(U)---
   UNLATCH LOWERCOUNT                                 735        702
                                                265 ---| |------(U)---
   UNLATCH LOWERGETONCLAMP                            735        703
                                                266 ---| |------(U)---
   UNLATCH LOWERRELAX                                 735        704
                                                267 ---| |------(U)---
   UNLATCH LOWERTIGHTENCLAMP                          735        705
                                                268 ---| |------(U)---
   UNLATCH LOWERTIGHTEN2                              735        706
                                                269 ---| |------(U)---
   UNLATCH LOWERSTALLED                               735        707
                                                270 ---| |------(U)---
   UNLATCH LOWERSCREWPROTRUSION                       735        708
                                                271 ---| |------(U)---
   UNLATCH LOWERPROTRUSION1                           735        709
                                                272 ---| |------(U)---
   UNLATCH LOWERPROTRUSION2                           735        710
                                                273 ---| |------(U)---
   UNLATCH LOWERPROTRUSION3                           735        711
                                                274 ---| |------(U)---
   UNLATCH LOWERLOOSENCLAMP                           735        712
                                                275 ---| |------(U)---
   UNLATCH LOWERSTAMPINGSENSED                        735        713
                                                276 ---| |------(U)---
   UNLATCH LOWERSTAMPING2                             735        714
                                                277 ---| |------(U)---
   UNLATCH LOWERDONELOOSENING                         735        715
                                                278 ---| |------(U)---
   LATCH LOWERGOINGLEFT IF SENSELOWERLEF
     TBUTTON                                          735        6            855
                                                279 ---| |------| |------(L)---
   UNLATCH LOWERGOINGLEFT IF SENSELOWERR
     IGHTBUTTON                                       735        7            855
                                                280 ---| |------| |------(U)---
```

BEST AVAILABLE COPY

```
GOTO LOWERFINDCLAMP IF SENSELOWERLEFT
  BUTTON AND NOT SENSELOWERLEFTSTOP A
  ND NOT CARRIERROTATING

           735         6           2
    281 ---| |-------| |-------|/|-----
           701        735
    282 ---| |-------(U)---

GOTO LOWERFINDCLAMP IF SENSELOWERRIGH
  TBUTTON AND NOT SENSELOWERRIGHTSTOP
  AND NOT CARRIERROTATING

           735         7           3
    283 ---| |-------| |-------|/|-----
           701        735
    284 ---| |-------(U)---

UPPERSTOP:
  UNLATCH UPPERLEFTTRAVERSE
           736        116
    285 ---| |-------(U)---
  UNLATCH UPPERRIGHTTRAVERSE
           736        14
    286 ---| |-------(U)---
  UNLATCH UPPERWRENCHCCW
           736        13
    287 ---| |-------(U)---
  UNLATCH UPPERWRENCHCW
           736        111
    288 ---| |-------(U)---
  UNLATCH UPPERWRENCHFORWARD
           736        15
    289 ---| |-------(U)---
  UNLATCH UPPERFINDCLAMP
           736        722
    290 ---| |-------(U)---
  UNLATCH UPPERFIND2
           736        723
    291 ---| |-------(U)---
  UNLATCH UPPERGETONCLAMP
           736        724
    292 ---| |-------(U)---
  UNLATCH UPPERRELAX
           736        725
    293 ---| |-------(U)---
  UNLATCH UPPERLOOSENCLAMP
           736        726
    294 ---| |-------(U)---
  UNLATCH UPPERSTAMPINGSENSED
           736        727
    295 ---| |-------(U)---
  UNLATCH UPPERSTAMPING2
           736        728
    296 ---| |-------(U)---
  UNLATCH UPPERNUTBACKOFF
           736        729
    297 ---| |-------(U)---
  UNLATCH UPPERBACKOFF2
           736        730
    298 ---| |-------(U)---
  UNLATCH UPPERDONELOOSENING
           736        731
    299 ---| |-------(U)---
  UNLATCH UPPERTIGHTENCLAMP
           736        732
    300 ---| |-------(U)---
  UNLATCH UPPERDRIVERCOUNTER
           736        733
    301 ---| |-------(U)---
  UNLATCH UPPERSTALLED
           736        734
    302 ---| |-------(U)---
  LATCH UPPERGOINGLEFT IF SENSEUPPERLEF
    TBUTTON
           736        106          054
    303 ---| |-------| |-------(L)---
  UNLATCH UPPERGOINGLEFT IF SENSEUPPERR
    IGHTBUTTON
           736        107          054
    304 ---| |-------| |-------(U)---
  GOTO UPPERFINDCLAMP IF SENSEUPPERLEFT
    BUTTON AND NOT SENSEUPPERLEFTSTOP A
    ND NOT CARRIERROTATING

           736        106          102
    305 ---| |-------| |-------|/|-----
           722        736
    306 ---| |-------(U)---

  GOTO UPPERFINDCLAMP IF SENSEUPPERRIGH
    TBUTTON AND NOT SENSEUPPERRIGHTSTOP
    AND NOT CARRIERROTATING

           736        107          103
    307 ---| |-------| |-------|/|-----
           722        736
    308 ---| |-------(U)---
```

BEST AVAILABLE COPY

```
STOPMACHINE:
   UNLATCH ROTATECARRIER                              737        716
                                              309  ---| |-------(U)---
   UNLATCH ROTATEWAIT                                 737        717
                                              310  ---| |-------(U)---
   UNLATCH ROTATEAGAIN                                737        718
                                              311  ---| |-------(U)---
   UNLATCH PULSE                                      737        719
                                              312  ---| |-------(U)---
   UNLATCH PULSE2                                     737        720
                                              313  ---| |-------(U)---
   UNLATCH ENDOFROTATION                              737        721
                                              314  ---| |-------(U)---
   UNLATCH FORWARDCARRIERROTATION                     737        12
                                              315  ---| |-------(U)---
   UNLATCH REVERSECARRIERROTATION                     737        11
                                              316  ---| |-------(U)---
   UNLATCH SAFETYMATISENABLED                         737        860
                                              317  ---| |-------(U)---
   LATCH LOWERSTOP                                    737        735
                                              318  ---| |-------(L)---
   GOTO UPPERSTOP                                     737        736
                                              319  ---| |-------(L)---
                                                      736        737
                                              320  ---| |-------(U)---

ECR: A ROTATE CARRIER IN REVERSE
   UNLATCH LOWERSTOP                                  738        735
                                              321  ---| |-------(U)---
   UNLATCH UPPERSTOP                                  738        736
                                              322  ---| |-------(U)---
   LATCH CARRIERROTATING                              738        850
                                              323  ---| |-------(L)---
   TIMER BUTTONCARRIERTIMER1 TO .3                    738        925
                                              324  ---|/|------(RST)--
                                                                 0
                                                      738        925
                                              325  ---| |------(RTO)--
                                                                 .3
   TIMER BUTTONCARRIERTIMER2 TO 2.5                   738        926
                                              326  ---|/|------(RST)--
                                                                 0
                                                      738        926
                                              327  ---| |------(RTO)--
                                                                 2.5
   LATCH REVERSECARRIERROTATION IF NOT B
     UTTONCARRIERTIMER1 OR BUTTONCARRIER
     TIMER2                                           738        925       R         926
                                              328  ---| |-------|/|-------OR -------| |
   UNLATCH REVERSECARRIERROTATION IF BUT
     TONCARRIERTIMER1 AND NOT BUTTONCARR
     IERTIMER2                                        738        925       926       11
                                              329  ---| |-------| |-------|/|------(U)
   GOTO STOPMACHINE IF NOT SENSEREVERSEC
     ARRIERROTATEBUTTON                               738        109       737
                                              330  ---| |-------|/|-------(L)---
                                                      737        738
                                              331  ---| |-------(U)---

ECR: A ROTATE CARRIER FORWARD
   UNLATCH UPPERSTOP                                  739        736
                                              332  ---| |-------(U)---
   UNLATCH LOWERSTOP                                  739        735
                                              333  ---| |-------(U)---
   LATCH CARRIERROTATING                              739        850
                                              334  ---| |-------(L)---
   LATCH FORWARDCARRIERROTATION                       739        12
                                              335  ---| |-------(L)---
```

BEST AVAILABLE COPY

```
GOIO STOPHACHINE IF NOT SENSEFORWARDC
  ARKIERROTATEBUTTON
```

```
          739        110       737
336   ---| |------|/|------(L)---
          737        739
337   ---| |------(U)---
```

We claim:

1. In a device for allowing glued pieces of wood to dry, said device incorporating clamps to hold the pieces of wood in close and high pressure engagement, the improvement comprising:

first means for automatically loosening said clamps including fluid driven rotating means mounted for engagement with said clamps;

second means for automatically tightening said clamps including fluid driven rotating means mounted for engagement with said clamps;

means connected to said tightening means for automatically flattening and securely holding the wood when said clamps are being tightened including a hold-down means actuated in coordination with said tightener means to:

(i) flatten the work piece while said clamp is tightened and (ii) to hold down and align the work piece at the location to the tightened; and a sensor for generating electrical signals on the sensing of the location of a clamp to be loosened and a clamp to be tightened and means in said clamp for generating an electrical signal indicative of the force exerted on said clamp by said tightener and said loosener.

2. The device of claim 1 further including a programmable controller connected to said sensor, said controller being programmed to actuate said loosener and tightener and said hold-down means on the occurrence of the various events in generation of electrical signals corresponding thereto as sensed by said sensor and said signal generating means.

3. A machine for clamping a plurality of glued pieces of wood, the improvement comprising:

an automated clamp loosener and tightener and flattener assembly, said assembly comprising:

a frame;

a loosener attached to said frame movable between a first position and a second position;

a tightener attached to said frame movable between a first and a second position;

flattener means attached to said frame and coacting with said tightener for flattening wood pieces at two adjacent work stations; and means to sense the location of said assembly including automatic proximity sensors mounted on said assembly for developing electrical signals indicative of the location of a clamp to be loosened or tightened and the location of said loosener or tightener in said first or second positions.

4. The machine of claim 3, wherein said electrical signals are connected to a programmed controller, programmed to move said loosener and said tightener between said first and second positions and to implement a controlled sequence with the output of said sensors.

5. A method of gluing wood comprising:

positioning a series of clamps for loading panel segments;

loading pre glued panel segments in said clamps;

traversing a wrench along a path to coact with the positioned clamps;

generating electrical signals to locate the position of said wrench with relation to said clamps;

sensing said signals to control the movement of said wrench to engage said clamps;

engaging said wrench with said clamps to tighten said clamps;

moving said clamps;

repositioning said series of clamps for loosening said clamp;

traversing a wrench along a path to coact with the repositioned clamps;

generating electrical signals to locate the position of said wrench with relation to said repositioned clamps;

sensing said signals to control the movement of said wrench to engage said repositioned claims;

engaging said wrench with said repositioned clamps to loosen said clamps.

* * * * *